United States Patent [19]

Kesting

[11] Patent Number: 5,520,253
[45] Date of Patent: May 28, 1996

[54] CUSTOM ASSEMBLED EQUIPMENT FOR LANDSCAPING

[75] Inventor: Lawrence W. Kesting, Owens Cross Roads, Ala.

[73] Assignee: Technical and Craft Services, Inc., Big Cove, Ala.

[21] Appl. No.: 419,074

[22] Filed: Apr. 10, 1995

Related U.S. Application Data

[63] Continuation-in-part of Ser. No. 338,275, Nov. 14, 1994, abandoned, which is a continuation-in-part of Ser. No. 93,263, Jul. 16, 1993, abandoned.

[51] Int. Cl.[6] .......................... A01R 33/00; B62D 51/04
[52] U.S. Cl. .............. 172/125; 74/355; 172/42; 172/49
[58] Field of Search ............................ 56/16.7, 16.9; 74/11, 15.6, 355, 377, 532, 551, 849; 172/1, 41, 42, 48, 49, 125, 142, 156, 176

[56] References Cited

U.S. PATENT DOCUMENTS

| | | | |
|---|---|---|---|
| 3,504,748 | 4/1970 | Croft | 172/42 |
| 3,603,162 | 9/1971 | Gohler | 172/42 X |
| 3,773,112 | 11/1973 | Zinck | 172/42 |
| 3,792,734 | 2/1974 | Ellis et al. | 172/43 |
| 3,807,506 | 4/1974 | Penley | 172/42 |
| 3,888,196 | 6/1975 | Glenn | 172/42 X |
| 4,214,632 | 7/1980 | Brookshier | 172/42 |
| 4,237,983 | 12/1980 | Allen | 172/42 |
| 4,244,427 | 1/1981 | Enters et al. | 172/42 |
| 4,286,670 | 9/1981 | Ackerman | 172/42 |
| 4,321,969 | 3/1982 | Wilson | 172/42 |
| 4,402,366 | 9/1983 | Dankel | 172/43 |
| 4,519,459 | 5/1985 | Reaume | 172/42 |
| 4,567,949 | 2/1986 | Hershier | 172/42 |
| 4,620,599 | 11/1986 | Zinck | 172/42 |
| 4,895,210 | 1/1990 | Witzel | 172/42 X |
| 5,101,911 | 4/1992 | Lee | 172/48 |
| 5,181,476 | 1/1993 | Rau et al. | 111/52 X |
| 5,224,552 | 7/1993 | Lee | 172/52 |

OTHER PUBLICATIONS

Troy bilt Great Gardens—Particularly pp. 12, 32, 36, 41, 42, 46 & 47.
Sears 1992 Lawn & Graden Catalog—pp. 22 to 24.
Introducing The 1992 Troy–Bilt Tiller–As Highlighted.

*Primary Examiner*—Dennis L. Taylor
*Assistant Examiner*—Robert Pezzuto

[57] ABSTRACT

A method employing a basic structure and a collection of components to improve efficiency in caring for laws and gardens. The basic structure comprises a single engine, speed reducer, and transmission mounted on a frame with handle bars and controls. The components make up a collection of tines, wheels, blades, rollers, plows, racks and mounting parts. The operator mounts selected components on the basic structure to create a custom ramification for accomplishing a specific task. The specification describes eighteen applications. Eight apply to common tasks of tilling, grading, removing snow, shredding, edging and mowing. The ten remaining apply to new methods for wet lands tilling, hard ground tilling, rolling, aerating, dethatching, scooping, lifting, cross country transporting, and automatic mixing and separating. A primary advantage of the method lies in a consolidation that reduces costs for capital outlay, maintenance, storage, and transportation of walk behind equipment. A secondary advantage exists in a power take-off and mounting base for pumps, blowers, and generators to operate log splitters, yard vacuums, chemical sprayers, recreational gear, and fire fighting equipment.

26 Claims, 31 Drawing Sheets

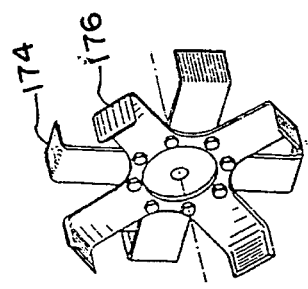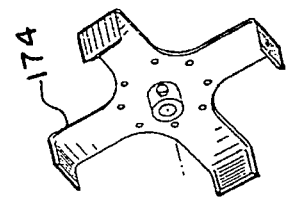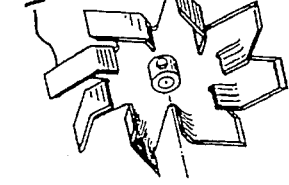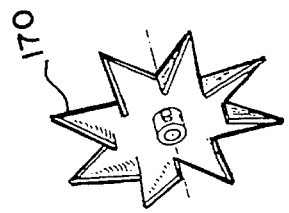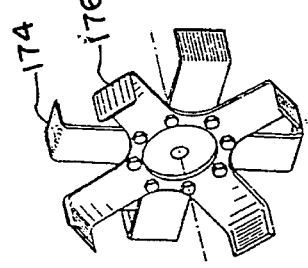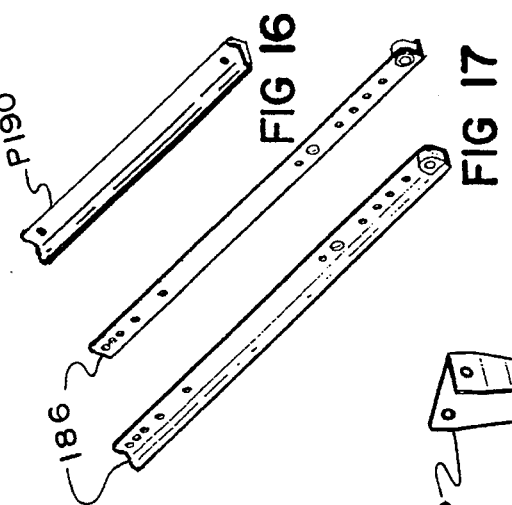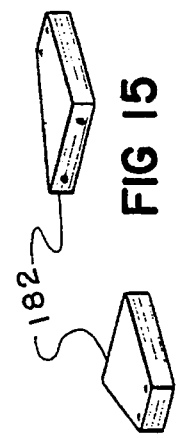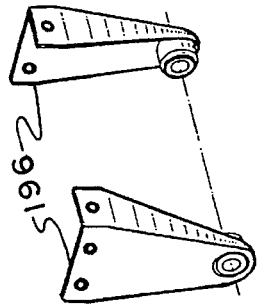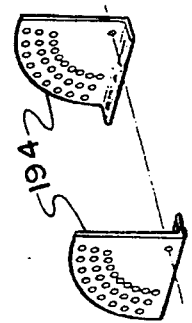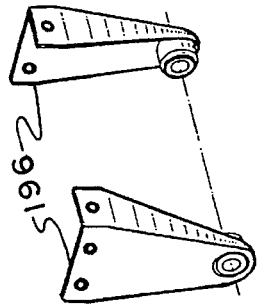

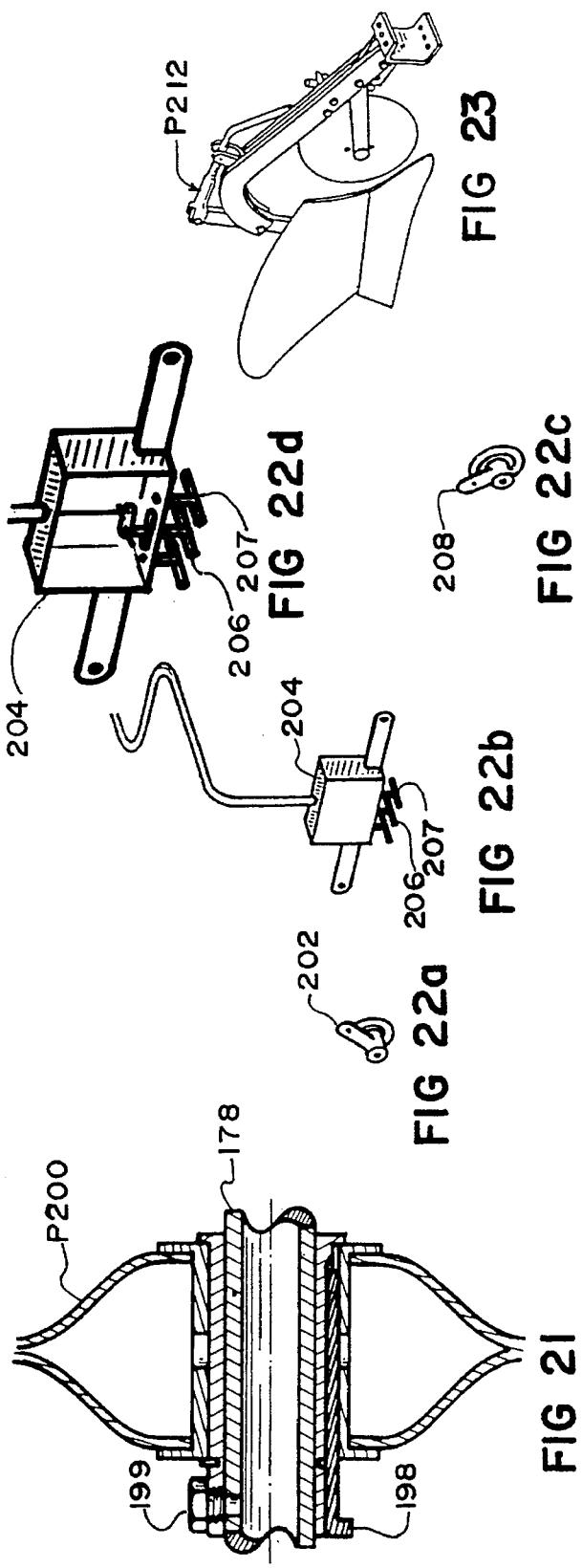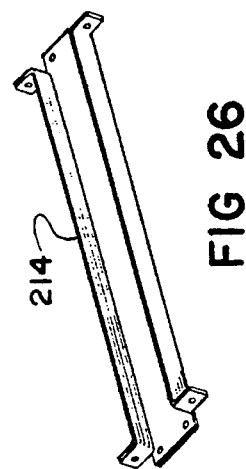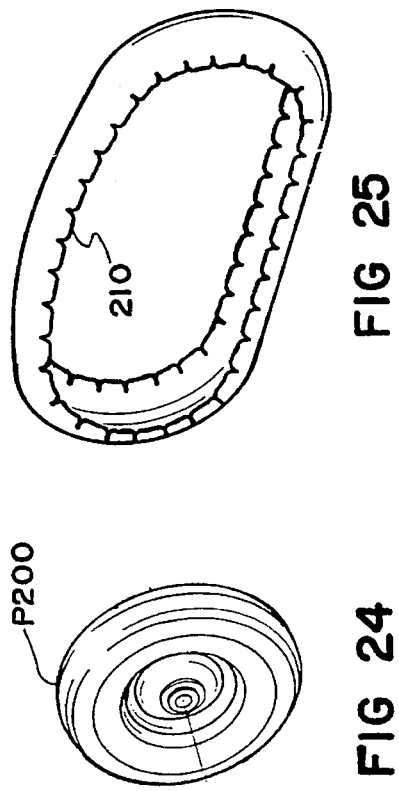

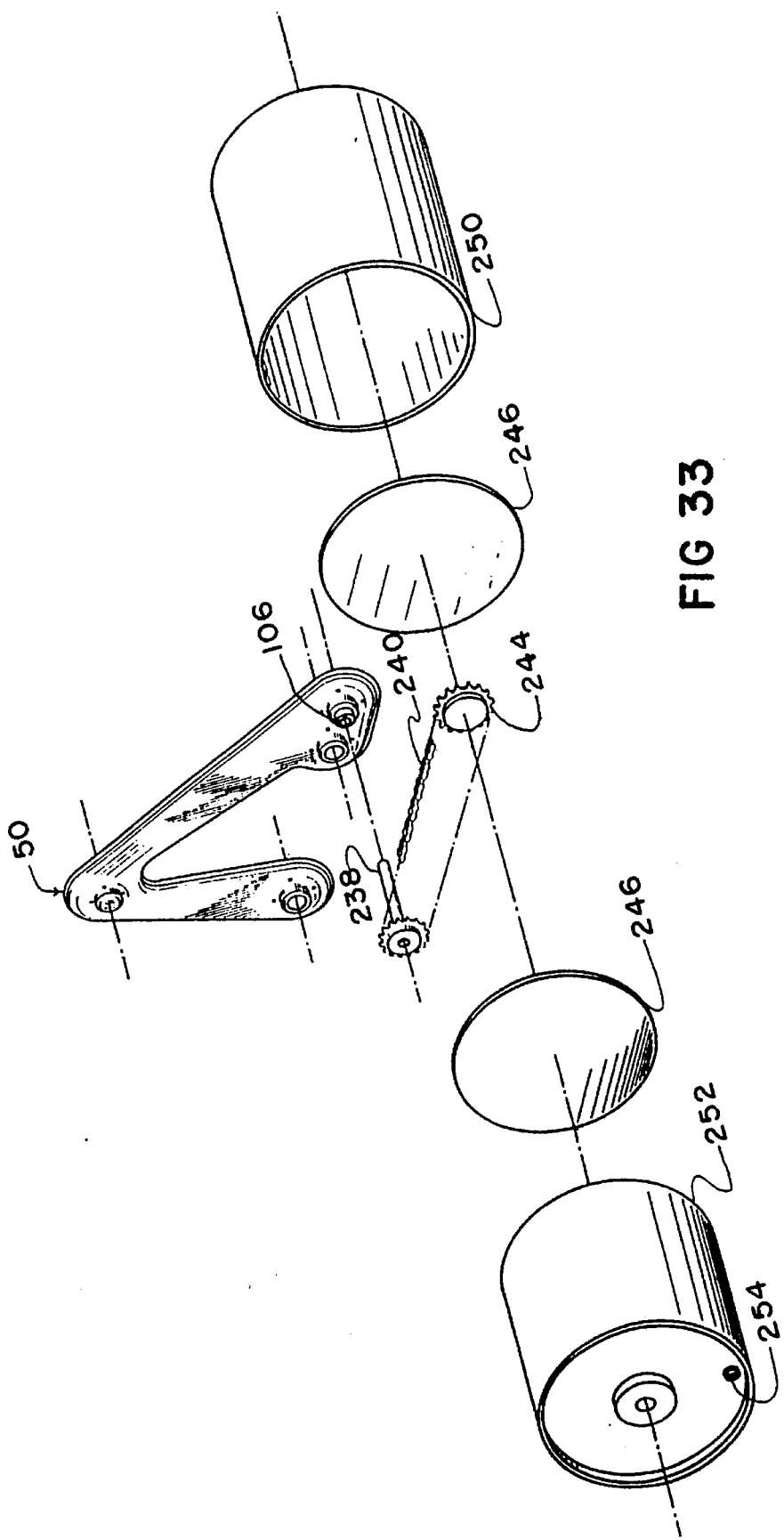

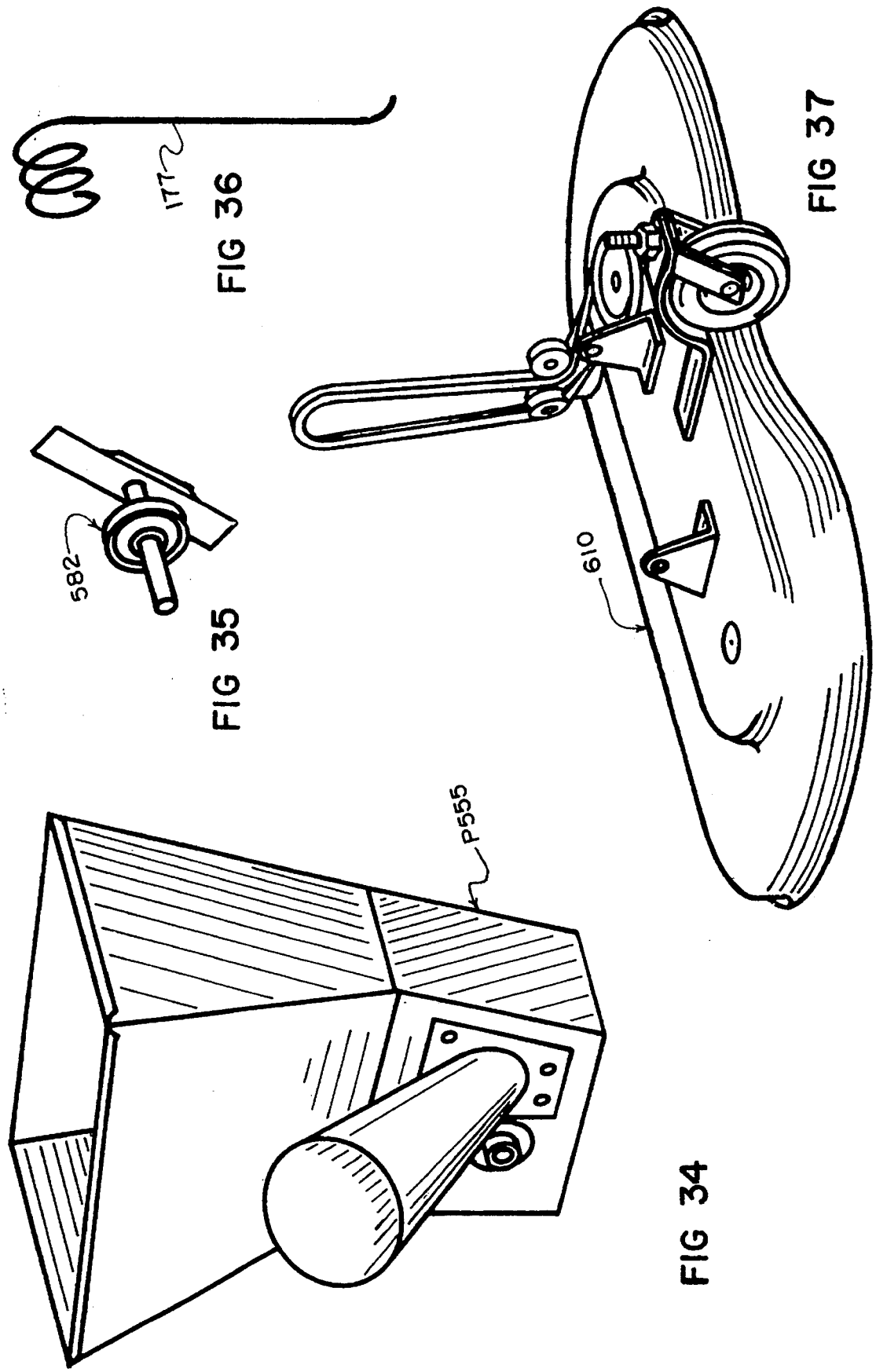

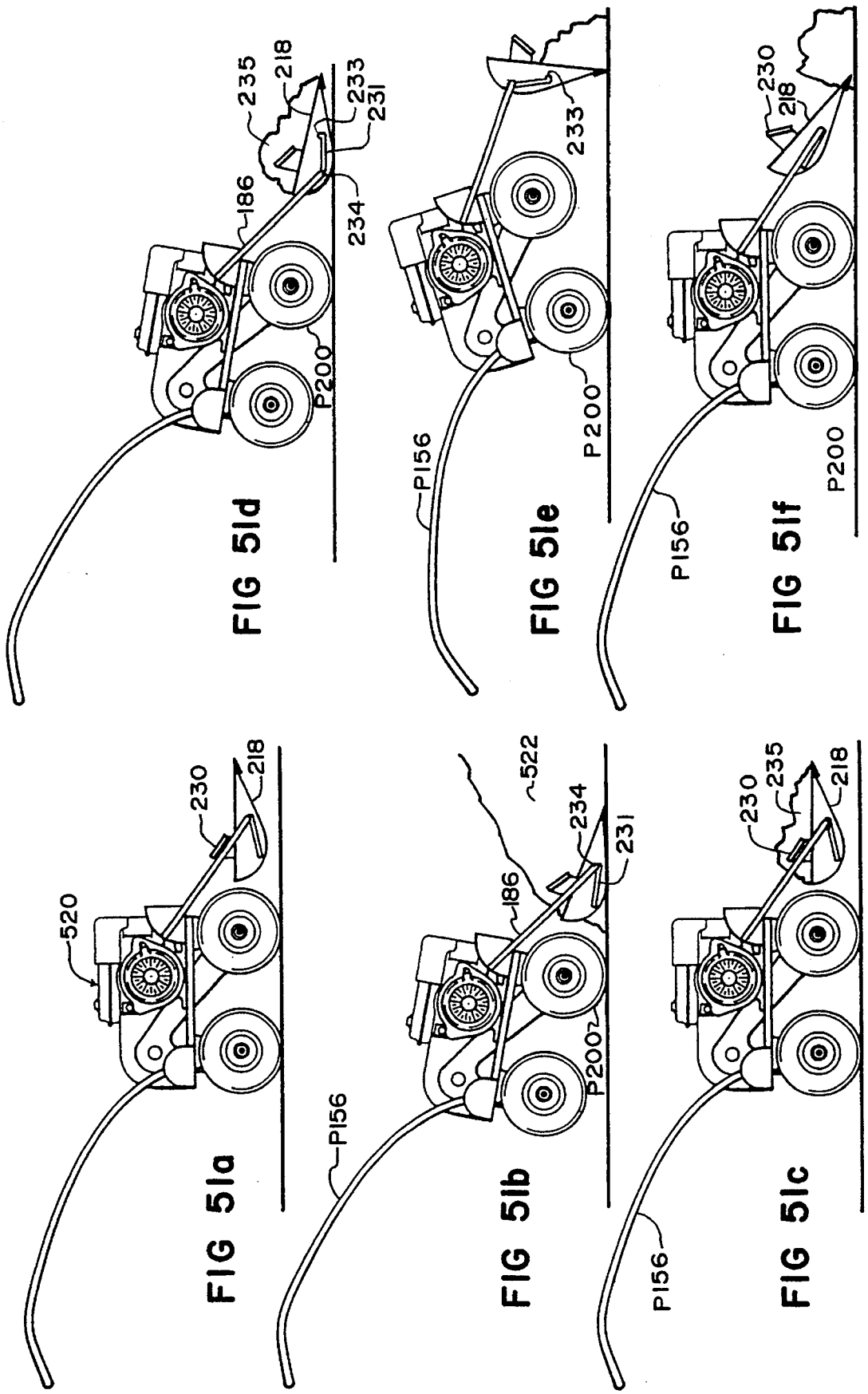

CUSTOM ASSEMBLED EQUIPMENT FOR LANDSCAPING

This is a continuation-in-part of Ser. No. 08/338,275, filed Nov. 14, 1994 "Custom Assembled Equipments For Landscaping", now abandoned, which is a continuation-in-part of Ser. No. 08/093,263, filed Jul. 16, 1993 "Competitive Medium Power Counterrotating Tiller", now abandoned.

BACKGROUND

This invention relates to incorporating equipment used in landscaping and gardening by walking attendants, specifically to mounting different combinations of components on a single, basic structure to accomplish unique tasks.

In the field of standard parts that yield multipurpose equipment for walking attendants inventors have done very little relative to other fields, such as wood shop machines. This trend results in part from the dominance of the riding tractor and attachments there to, such as mower decks, snow removers, and dozer blades. However, designers have failed to adapt the so called garden tractor to cultivating a growing vegetable garden, or to edging, shredding, mixing, and separating. The aforementioned trend also stems from not recognizing emerging pollution requirements and farmland conservation efforts. Nonpolluting engines raise first cost and maintenance. The smaller landscaped plots of the future; which will be intricate, manicured, separated, and sloping; will probably require walk behind equipment exclusively. If tractor drawn equipment survives, it will require increased supplementary action from walk behind implements. However, the prior art provides only complex special units for walking attendants.

Common characteristics of equipment operated and serviced by walking attendants that till, grade, shred, edge, mow, and remove snow include for each piece; (1) an individual power plant, usually a gasoline engine that creates a fire hazard when the tank is undrained; (2) many nonstandard parts that elevate first cost and maintenance; (3) bulk which is difficult to clean, store, or transport to a rental or service agency; (4) a unique application that occurs seasonally and infrequently. These disadvantages manifest excessive capital, maintenance, storage, and transportation expenditures.

The general problem is, therefore, how to reduce capital and operating costs for walk behind equipment that till, grade, shred, edge, mow, and remove snow. One implement with a single engine that would perform all six tasks would be ideal. From a practical view point some adjustment would be necessary such as manipulating controls and adding and deleting components. Since grading, mowing, and removing snow require a forward and backward motion, a high response, console controlled mechanism for reversing rotation is required. Fundamentally, the effort by the operator to assemble and operate the custom implements must not exceed the savings in capital and operating expenditures realized from incorporating.

In response to the general problem and disadvantages cited inventors created limited systems of implements and torque reversing techniques. U.S. Pat. No. 3,490,541 to Adams (1970) shows a wet lands tiller with buoyant shoes and a torque reversing system controlled by a lever that activates a separate hydraulic system. Adams's machine demonstrated the feasibility of wet lands tilling using a large commercial machine with buoyant shoes. However, the torque reversing technique is too complex and costly for residential equipment. U.S. Pat. No. 4,286,671 to Mays (1981) shows a kit for converting a rotary tiller into a plow. However, the plow cuts a narrow, shallow furrow that appears suitable only for planting. U.S. Pat. No. 4,321,969 to Wilson (1982) shows a reversing mechanism activated by raising or lowering the engine. The mechanism, which is extensive and cumbersome, complicates mounting the engine. U.S. Pat. No. 4,519,459 to Resume (1985) shows a reversing transmission for a tiller. However, the gears employed make it prohibitively expensive. U.S. Pat. No. 4,620,599 to Zinck (1986) shows a counterrotating tiller with wings that vary the distance between output shafts and thereby adapt to different sizes of rotative tines. However, the machine is limited to tilling. U.S. Pat. No. 4,802,536 to O'Neal (1989) shows a rotary cultivator with a dethatcher means that replaces tines. However, the machine functions on only two tasks, i.e., cultivating and dethatching. U.S. Pat. No. 4,804,047 to Kobashi et, el (1989) shows a rotary tilling device that also mows. The device applies to tractors. U.S. Pat. No. 5,181,476 to Rau (1993) shows a system for simultaneous ground soil preparation and sowing. However, the machine is tractor powered for commercial use. U.S. Pat. No. 5,224,552 to Lee, et, el (1993) shows a reversible machine that can be altered to till, mow, or remove snow. However, reversing is not controllable from a console and the reel type mower is limited in application. Several manufacturers offer rear tine tillers with dozer blade attachments. However, the high speed used on the rear tines dulls the tine cutting edges in rocky soil. None of the references cited incorporate more than three types of machines. Nevertheless specific problems remain for the average landscape manager using walk behind equipment. A budget, schedule, and plot layout limit storage facilities and expenditures for equipment and hired help. The operator mixes and separates by hand, waits for soil to dry before cultivating, loosens hard ground with a pick, and improvises ballast on tillers. He does not attempt simultaneous moldboard and chisel plowing, rolling and aerating, or aerating and dethatching. He rolls lawns with leg power, scoops with a scoop shovel, lifts with his back, ascends ramps with a hand truck, transports cross country with a wheel barrow, an fights forest fires with a garden hose. Since manufacturers lock in the user with pedantic instructions for unalterable, single purpose equipment, they deny the manager/operator use of certain creative abilities and special knowledge of his own plot that could optimize his efforts.

OBJECTS

Accordingly an object of my invention provides an inventory of components, a powered basic structure, and a method for assembling selected components to the basic structure to yield a completed machine for use on a unique task.

A further object extends the method to yield machines that till, grade, shred, edge, mow, and remove snow.

A further object refines the method so that the cost for the inventory, basic structure, and assembly is less than the cost for separate machines supplied by the prior art.

Another object provides a method for assembling additional components to the basic structure to create machines for tilling wet lands and hard ground and, for rolling, aerating, dethatching, scooping, lifting, transporting, mixing, and separating.

Another object supplies a mounting on the basic structure for auxiliary equipment powered by the engine.

A qualifying object of my invention limits the aforementioned methods to the use of one inventory of components selectively mounted on one basic structure with a single engine.

Further objects and the advantages of my invention will become apparent from a consideration of the drawings and ensuing description.

DRAWING FIGURES

In the drawings numbers for prior art parts are prefaced by the letter "P".

FIG. 10 shows an aerating tine

FIGS. 11a to 11b show chisel tines.

FIGS. 12a to 12b show low penetrating tines

FIG. 13 shows an axle

FIG. 14 shows an insert for an axle.

FIG. 15 shows a pair of frame extensions.

FIG. 16 shows a typical structural angle brace.

FIG. 17 shows a pair of support bars.

FIG. 18 shows a pair of rear flanges.

FIG. 19 shows a pair of front flanges.

FIG. 20 shows a pair of corner braces.

FIG. 21 shows a section of a typical wheel.

FIG. 22a to 22d show automatic stops and a signal initiator to reverse rotation.

FIG. 23 shows a typical moldboard plow.

FIG. 24 shows a typical wheel.

FIG. 25 shows a typical wheel track.

FIG. 26 shows a channel brace.

FIG. 33 shows an exploded view of the roller in FIG. 29.

FIG. 34 shows a shredder.

FIG. 35 shows an edger subassembly.

FIG. 36 show a dethatchment tine.

FIG. 37 shows a mower deck.

FIGS. 51a to 51f show the sequence of operations for a powered scoop.

Figure 1:
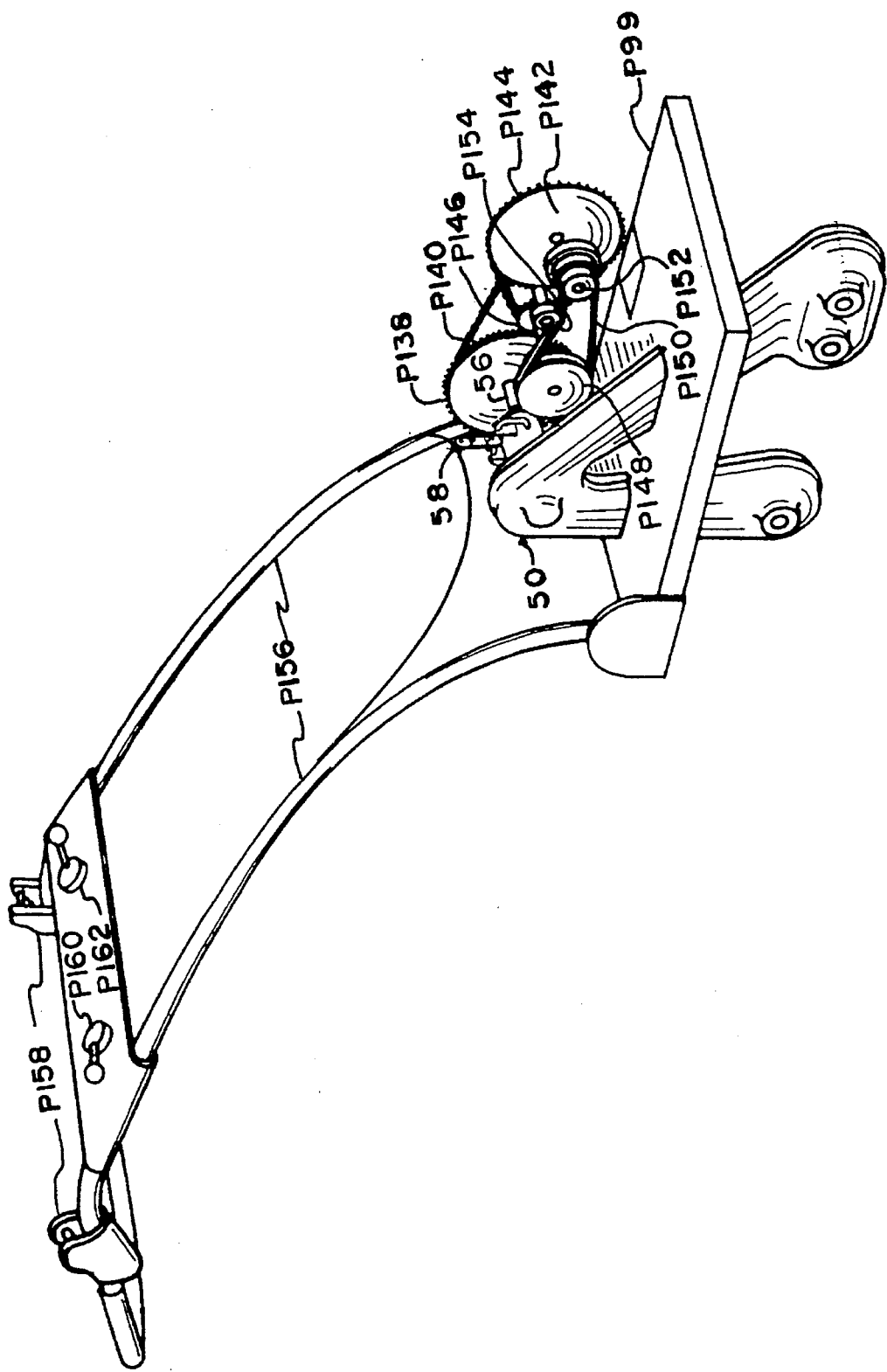
FIG. 1 shows the preferred embodiment on a background of prior art.

| REFERENCE NUMERALS | |
|---|---|
| 49 | Transmission for Second Embodiment |
| 50 | Transmission for Preferred Embodiment |
| 51 | Transmission for Third Embodiment |
| 52 | Male Half Housing |
| 54 | Female Half Housing |
| 56 | Powered Inlet Shaft |
| 58 | Reversing Clutch Assembly |
| 60 | Collar |
| 62 to 66 | Shifter Bushings |
| 68 | Right Jawed Sprocket |
| 70 | Dampening Spring |
| 72 | External Spline |
| 73 | Spline Snap Ring |
| 74 | Double Radial Jawed Sleeve |
| 76 | Stabilizing Shaft |
| 77 | Bushing Snap Ring |
| 78 | Left Jawed Sprocket |
| 79 | Elongated Roller Chain |
| 80 | Roller Chain Preferred |
| 81 | Shortened Roller Chain |
| 82 | Bushing |
| 84 | Bushing Support |
| 86 to 90 | Male Bushing |
| 92 | Sprocket at Rear Wing |
| 94 | Bushing Rear Female |
| 98 | Bushing Support Rear |
| P99 | Frame |
| 100 | Seal |
| 102 | Hollow Shaft Outlet Rear |
| 104 | Counterrotating Outlet |
| 106 | Like Rotating Outlet |
| 107 | Hollow Shaft Set Bolt |
| 108 to 112 | Bushings Like Rotating |
| 114 to 118 | Bushings Counterrotating |
| 120 | Gear Like Rotating |
| 121 | Idler Sprocket |
| 122 | Gear Counterrotating |
| 123 | Counterrotating Sprocket |
| 124 | Like Rotating Sprocket |
| 126 to 136 | Bushing Assemblies |
| P138 | Power Input Sprocket |
| P140 | Input Roller Chain |
| P142 | Reducing Sprocket |
| P144 | Reducing Roller Chain |
| P146 | High Speed Sprocket |
| P148 | Stepped Pulley |
| P150 | V-Belt For Reducer |
| P152 | Engine Stepped Pulley |
| P154 | Engine Clutch Pulley |
| P156 | Handlebars |
| P156 | Rotation Reversing Grips |

-continued

REFERENCE NUMERALS

| | |
|---|---|
| P160 | Engine Clutch Control |
| P162 | Engine Throttle Control |
| P164 | Typical Gasoline Engine |
| 166 | Basic Structure |
| 168 | Agitator |
| 170 | Aerating tine |
| 172 | Chisel Tine |
| 174 | Nonpenetrating Tine |
| 176 | Unhubbed Tine |
| 177 | Dethatchment tine |
| 178 | Axle |
| 180 | Axle Insert |
| 182 | Frame Extension, Pair |
| P190 | Structural Angle |
| 192 | Rear Flange, Pair |
| 194 | Front Flange, Pair |
| 196 | Corner Braces, Pair |
| 198 | Wheel Key |
| 199 | Wheel Set Bolt |
| P200 | Wheel |
| 202 | Spring Loaded Stop Rear |
| 204 | Cable Activator |
| 206 | Bell Crank |
| 208 | Spring Loaded Stop Front |
| 210 | Wheel Track |
| P212 | Typical Moldboard Plow |
| 214 | Channel Brace |
| 216 | Double Blade |
| 218 | Single Blade |
| 220 | Blade Back Half |
| 222 | Blade Top Stabilizer |
| 224 | Scraper |
| 226 | Connector Strap |
| 227 | Nut |
| 228 | Blade End Plates |
| 229 | Open Side Washer |
| 230 | Scoop Stop |
| 231 | Scoop Slot |
| 232 | End Plate Covers |
| 233 | Notch in Scoop End |
| 234 | Rectangular Head Bolt |
| 235 | Scoop Load |
| 236 | Assembled Cylinder |
| 238 | Sprocketed Shaft Insert |
| 240 | Roller Roller Chain |
| 244 | Roller Sprocket |
| 246 | Roller End Plate |
| 250 | Right Roller End |
| 252 | Left Roller End |
| 254 | Water Ballast Port |
| 256 | Snow Plow Blade |
| 300 | Front Tine Tiller |
| 320 | Counterrotating Tiller |
| 340 | Mixer and Separator |
| 342 | Sluice Box |
| 344 | Bottom Mesh |
| 360 | Wet Lands Tiller |
| 380 | Ballasted Chisel Plow |
| 400 | Chisel and Moldboard Plow |
| 420 | Small Area Grader |
| 440 | Snow Dozer |
| 460 | Snow Plow |
| 480 | Powered Roller |
| 500 | Aerator and Roller |
| 510 | Aerator and Dethatcher |
| 520 | Powered Scoop |
| 540 | Powered Hand Truck |
| 542 | Fork Lift Rack |
| P544 | Fluid Container |
| P546 | Fluid Pump |
| P548 | Pulley and V-Belt |
| P550 | Reel, Hose and Nozzle |
| P555 | Shredder |
| P557 | Shredder Shaft |
| P559 | V-Belt For Shredder |
| 560 | Shredder Self Propelled |
| 580 | Edger |
| 582 | Edger Subassembly |

-continued

REFERENCE NUMERALS

| | |
|---|---|
| P584 | V-Belt For Edger |
| 586 | Edger Blade |
| 600 | Mower |
| 610 | Mower Deck |
| P615 | V-Belt for Mower |

DESCRIPTION

The embodiments are made up from a basic structure and a collection of components for mounting on this structure. The preferred embodiment is a basic structure 166 shown in FIG. 7 that employs a transmission 50 shown in FIGS. 2 to 6 and the components shown in FIGS. 10 to 37. Second and third embodiments employ transmissions 49 and 51 described in FIGS. 8 and 9 as modifications of transmission 50. Second and third embodiments, also, accept components shown in FIGS. 10 to 37.

Figure 7:
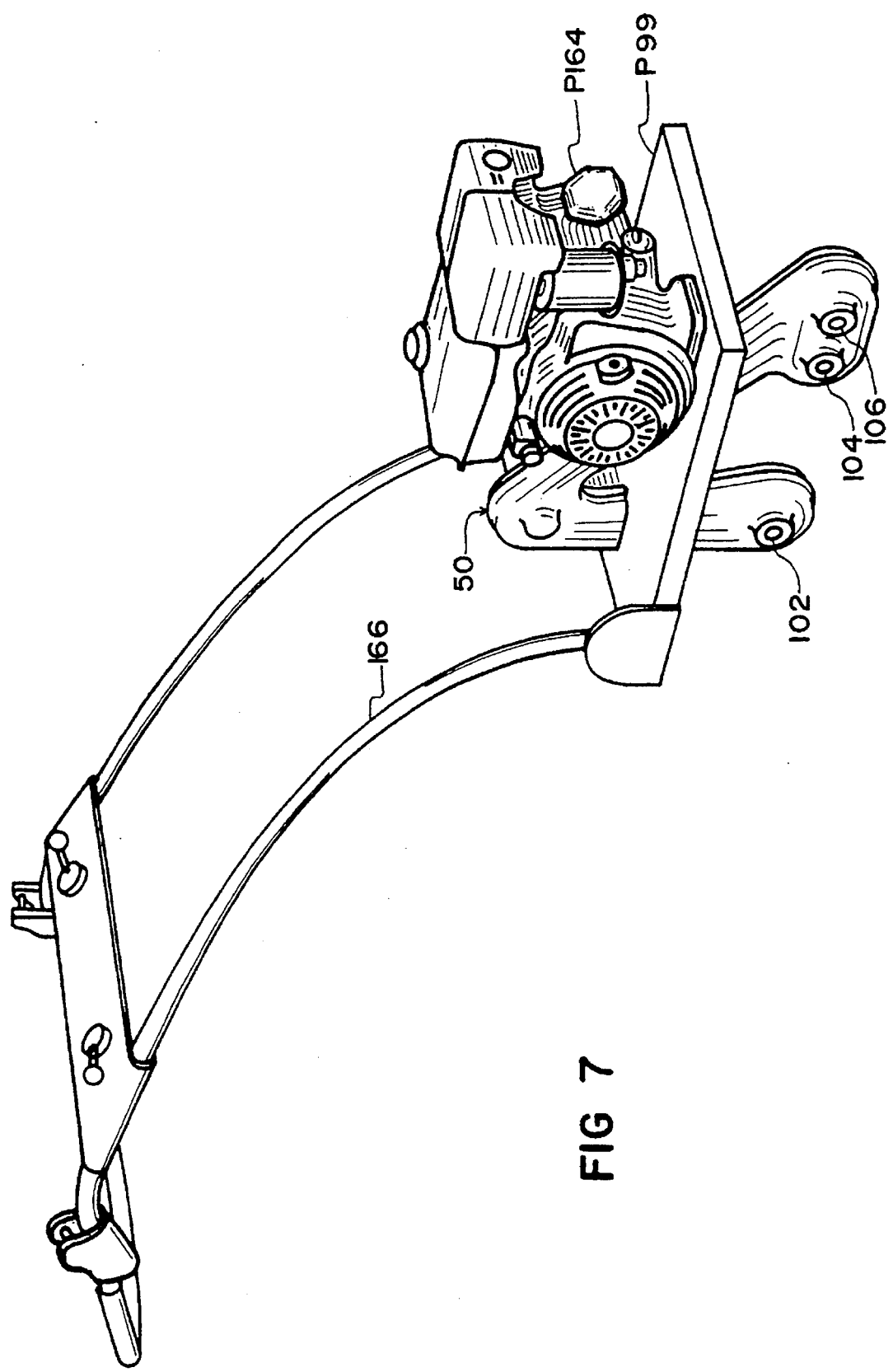
FIG. 7 shows the basic structure of the preferred embodiment.

The description of the basic structure 166 begins with FIG. 1. There the heart of my invention, i.e., a transmission 50, protrudes through a frame P99. A reversing clutch shifter assembly 58 projects a power input shaft 56 to a larger diameter sprocket P138 meshing with a roller chain P140. A smaller diameter sprocket screened from view by a reducing sprocket P142 receives chain P140 and concentrically supports sprocket P142 on a shaft not shown. A roller chain P144 meshes with sprocket P142 and a smaller sprocket P146 mounted on a shaft supporting a larger stepped pulley P148. A V-belt P150 joins pulley P148 with a smaller stepped pulley P152 through a clutch pulley P154 on an engine not shown in FIG. 1. A shroud, which is not shown for clarity, supports parts P138 through P154. A pair of handlebars P156 support flexible cables not shown connected to an engine clutch control P160 and an engine throttle control P162. Also a pair of handgrips P158 mounted on handlebars P156 provide control via flexible cable for clutch assembly 58. FIG. 7 shows the basic structure 166 completed with the addition of a typical gasoline engine P164.

Figure 2:
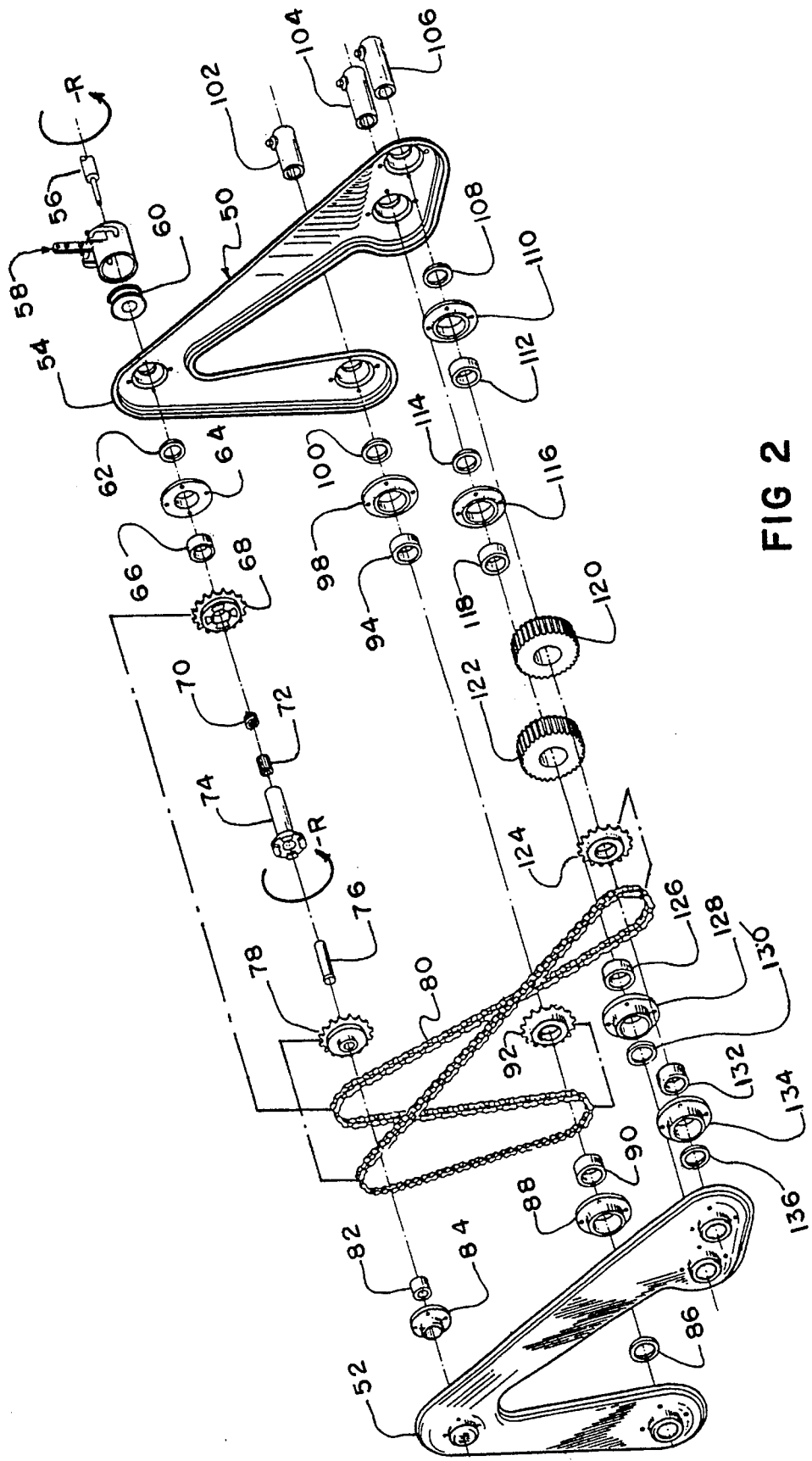
FIG. 2 shows an exploded view of the transmission in FIG. 1.

Structurally FIG. 2 shows an exploded view of transmission 50. FIGS. 3 to 6 show sectional views of the input apex and output wings of transmission 50. These views are best identified by part number rather than section lines since FIG. 2 is exploded. Powered inlet shaft 56 rotatably attaches to an external spline 72 through a dampening spring 70. A snap ring 73 retains spline 72. Shaft 56 also enters a splined and jawed sleeve 74 which rotatably supports a right jawed sprocket 68 and press fits a collar 60. A bushing assembly from parts 62, 64, and 66 attaches sleeve 74 at a first end to a transmission female half housing 54. A solid, stabilizing shaft 76 rotatably supports a left jawed sprocket 78 and rotatably enters sleeve 74 as a support at a second end. Shaft P76 rotatably adheres to a male half housing 52 through a snap ring 77 and bushing assembly of parts 82 and 84. A sprocket 92 press fits a rear wing hollow outlet shaft 102 which is supported in housing 52 by a bushing assembly of parts 86, 88 and 90. A bushing assembly of parts 94, 98 and 100 supports outlet shaft 102 in housing 54. A counterrotating spur gear 122 press fits a counterrotating hollow outlet shaft 104 which is supported in housing 52 by a bushing assembly of parts 126, 128 and 130. A bushing assembly of parts 114, 116 and 118 supports outlet shaft 104 in housing 54. A like rotating hollow outlet shaft 106 press fits a sprocket 124 and a like rotating spur gear 120 which meshes with counterrotating spur gear 122. A bushing assembly of parts 108, 110 and 112 supports outlet shaft 106 in housing 54 and a bushing assembly of parts 132, 134, and 136 supports shaft 106 in housing 52. A roller chain 80 of the preferred embodiment meshes with sprockets 68, 78, 92 and 124. Structural details become more evident in the following operational description.

The operational description of basic structure 166 begins in FIG. 7, where a typical gasoline engine P164 supplies rotary power to pulley P152 shown in FIG. 1. The train of belts, pulleys, chains, and sprockets designated by parts P152 through P138 reduce the rate of rotation in typical prior art fashion by approximately 10 to 1. Inlet shaft 56 shown in FIGS. 1 and 2 picks up this rotation in the exemplary direction shown by the letter –R, and shaft 56 drives sleeve 74 through spring 70 and spline 72 all in the –R direction. Sleeve 74 turns freely between sprockets 78 and 68 when shifter assembly 58 is in neutral. When hand grips 158 activate shifter 58 via prior art flexible cables from a console, collar 60 moves sleeve 74 axially from neutral. When sleeve 74 engages sprocket 78, chain 80 drives sprockets 92 and 124 in the –R direction and sprocket 68 in the +R direction. When sleeve 74 engages sprocket 68, chain 80 drives sprockets 124, 78 and 92 in the +R direction. Sprocket 92 and hollow shaft 102 rotate in the same direction. Sprocket 124, hollow shaft 106 and gear 120 rotate in the same direction. Gear 120 drives gear 122 and its supporting shaft: 104 in a direction opposite to that for gear 120 and shaft 106. In summary hollow shafts 102 and 106 always rotate in the same direction and opposite to the direction of hollow shaft 104 regardless of the direction of input rotation to inlet shaft 56. FIG. 7 shows a completed basic structure 166 of the preferred embodiment of my invention.

Figure 8:
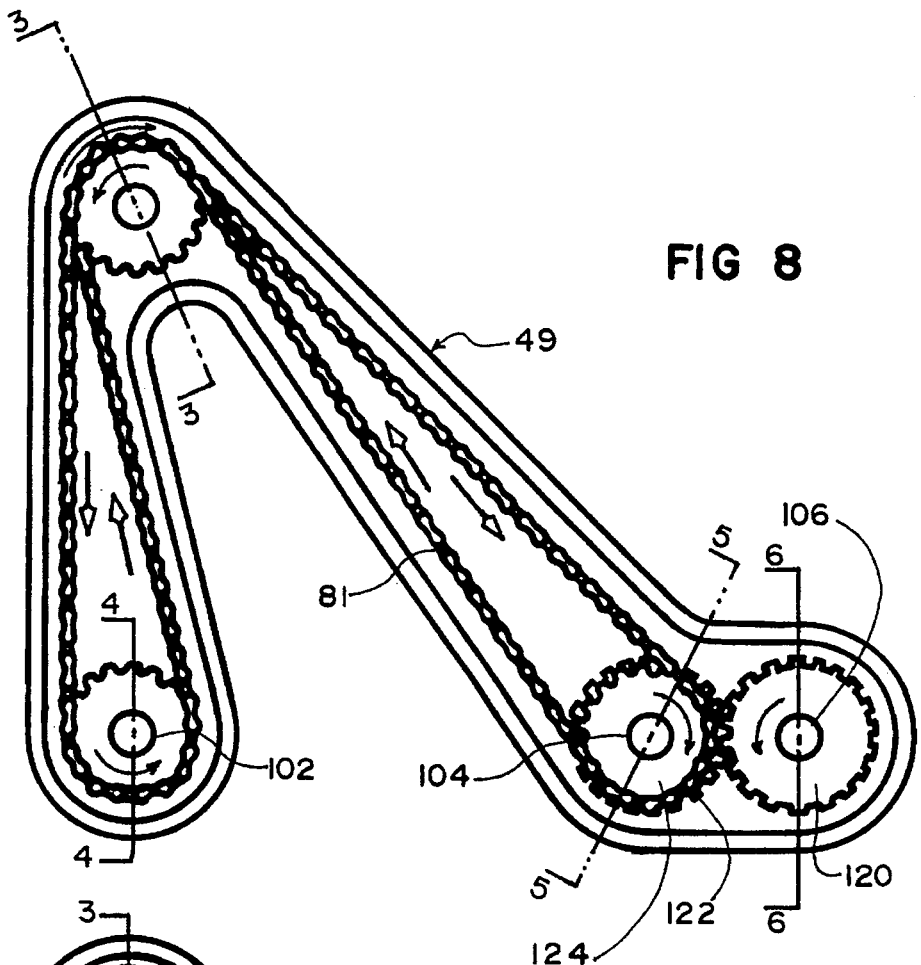
FIG. 8 shows a second embodiment.

FIG. 8 shows a second embodiment which is a modification of transmission 50, FIG. 2. The modification occurs when chain 80 is separated, reversed, and reassembled to form a chain 81; and sprocket 124 is transferred from shaft 106 to shaft 104. Chain 81 then contacts sprocket 124 so as to drive shaft 104 opposite to the direction of rotation of shaft 102. Therefore, gear 122 drives gear 120 and shaft 106 in the same direction that shaft 102 rotates.

Figure 9:
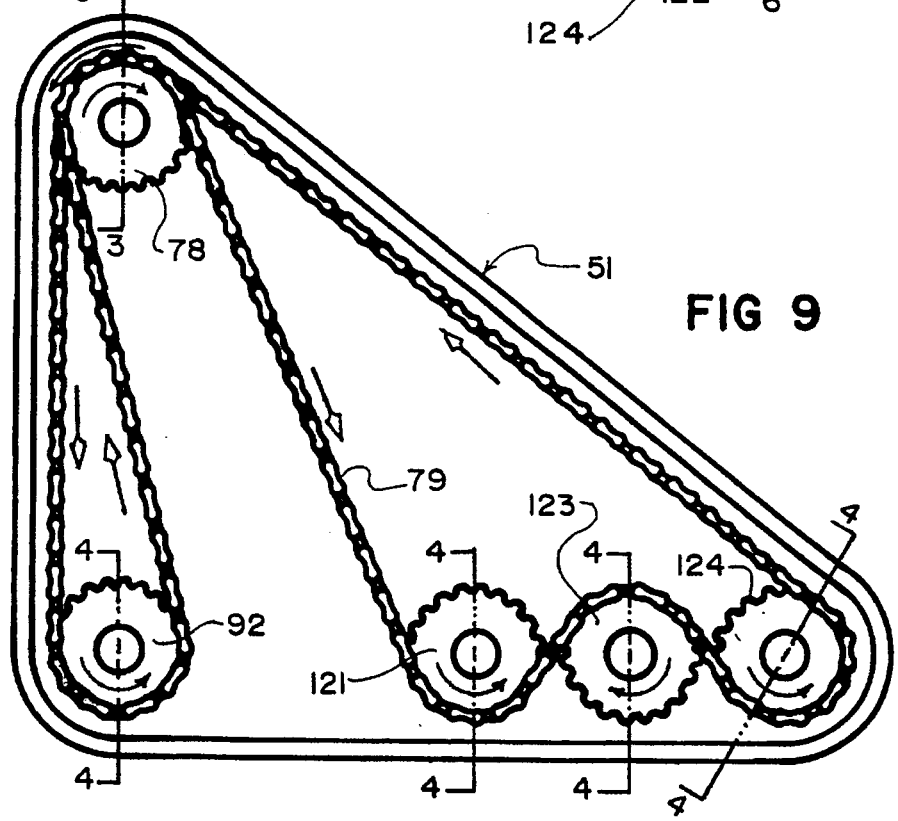
FIG. 9 shows a third embodiment.

FIG. 9 shows a third embodiment of transmission 50, FIG. 2, whereby gears 120 and 122 are eliminated and a pair of sprockets 123 and 121 are added. An elongated chain 79 contacts sprocket 124 to drive it counterclockwise for example. Then it contacts the following sprockets to drive them as indicated: sprocket 123 cw; sprocket 121, ccw; sprocket 78 cw; sprocket 92 ccw; and ccw for sprocket 68 which is superimposed by sprocket 78.

Therefore, all three embodiments of the transmission shown in FIGS. 2 to 9 provide identical rotary outputs. The preferred embodiment provides the best combination of structural integrity, economy of materials, appearance, and originality. However, the second embodiment requires less chain and provides more space to mount an engine. The third may be cheapest but adds significant weight.

The structure and operation of the components shown in FIGS. 10 through 37 can be described best when they are called to make up the ramifications.

RAMIFICATIONS

Figure 38:
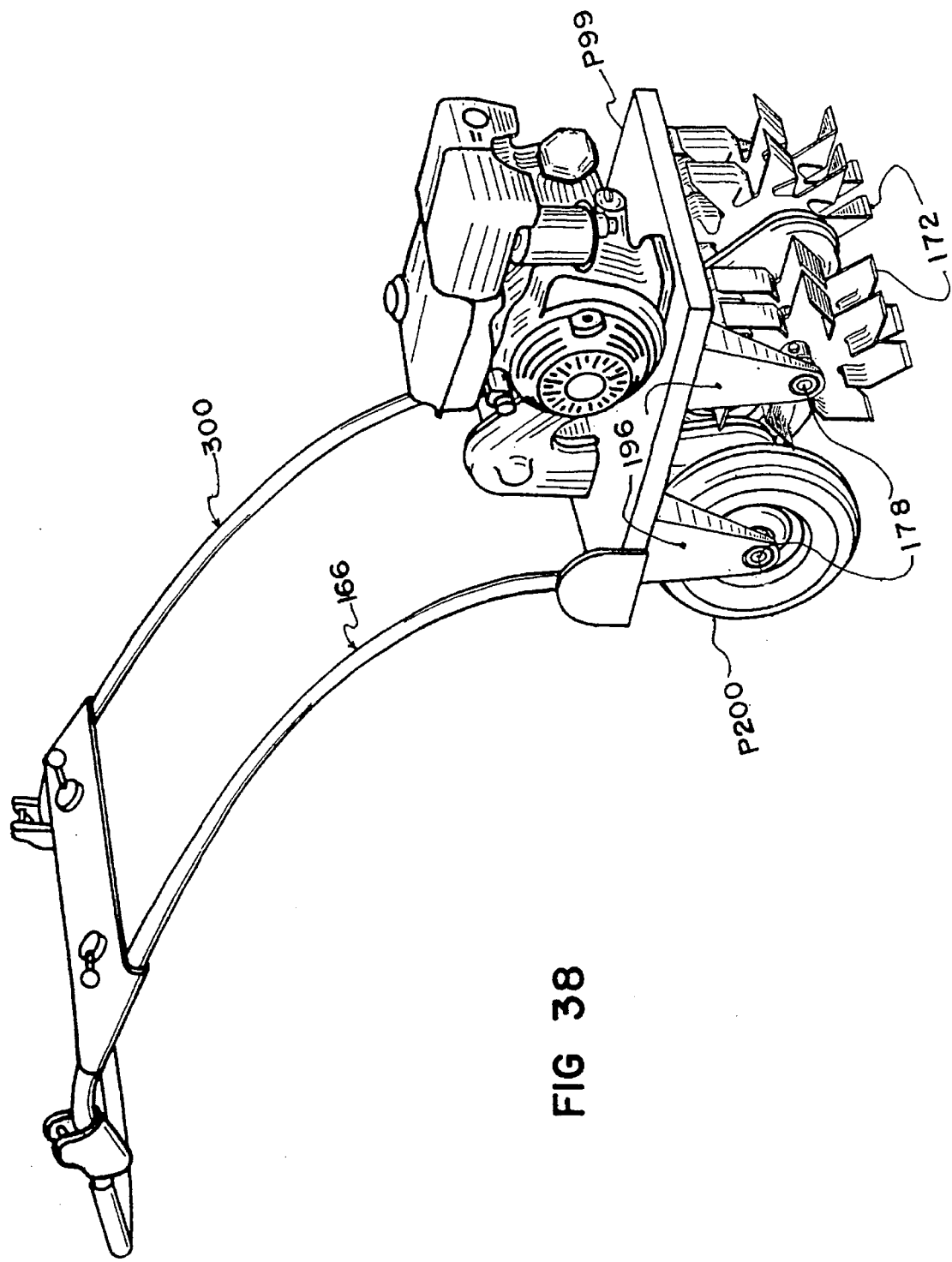
FIG. 38 shows a front tine tiller.

FIG. 38 shows Ramification I a front tine tiller 300. The operator assembles tiller 300 by attaching the following components to basic structure 166: A front axle 178 FIG. 13 into hollow shaft 104 and rear axle 178 into hollow shaft 102, FIG. 2; a double pair of chisel tines 172 FIGS. 11a and 11b on front axle 178; a pair of wheels P200 FIG. 24 on rear axle 178 by set bolt 199, FIG. 21; and a plurality of axle corner braces 196 FIG. 20 to axles 178 and frame P99. Tiller 300 operates as a conventional front tine tiller. Set bolts 107, FIGS. 4, 5, and 6 in shafts 102 and 104 and tines 172 cause a roto-tiller action. Wheels P200 rotate freely on rear axle 178 when a key 198 FIG. 21 is removed. Many suppliers of lawn and garden equipment offer wheels that either rotate freely on an axle or receive rotary power through a key or set screw. FIG. 21 shows an example of a wheel P200 longitudinally positioned on an axle 178 by a set bolt 199 where removable key 198 transfers rotary power from axle 178 to wheel P200.

Figure 39:
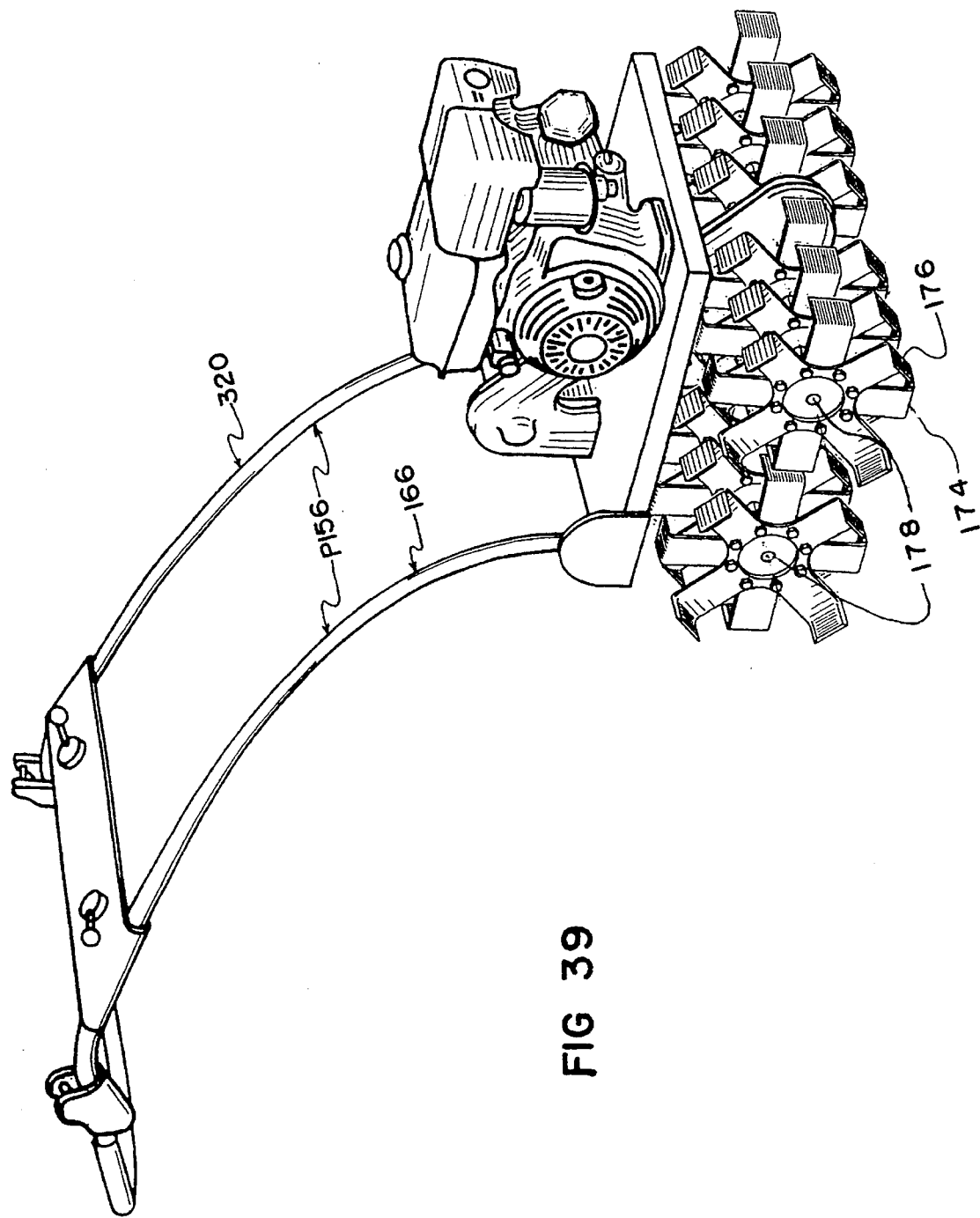
FIG. 39 shows a counterrotating tiller

FIG. 39 shows Ramification II a counterrotating tiller 320. The operator assembles tiller 320 by attaching the following components to basic structure 166: front axle 178 into shaft 104; rear axle 178 into shaft 102, FIG. 2; and an array of nonpenetrating tines 174 and 176, FIG. 12 to axles 178 which counterrotate. The operator manipulates tiller 320 as described in the references, i.e. tilting the machine with handlebars P156.

Figure 40:
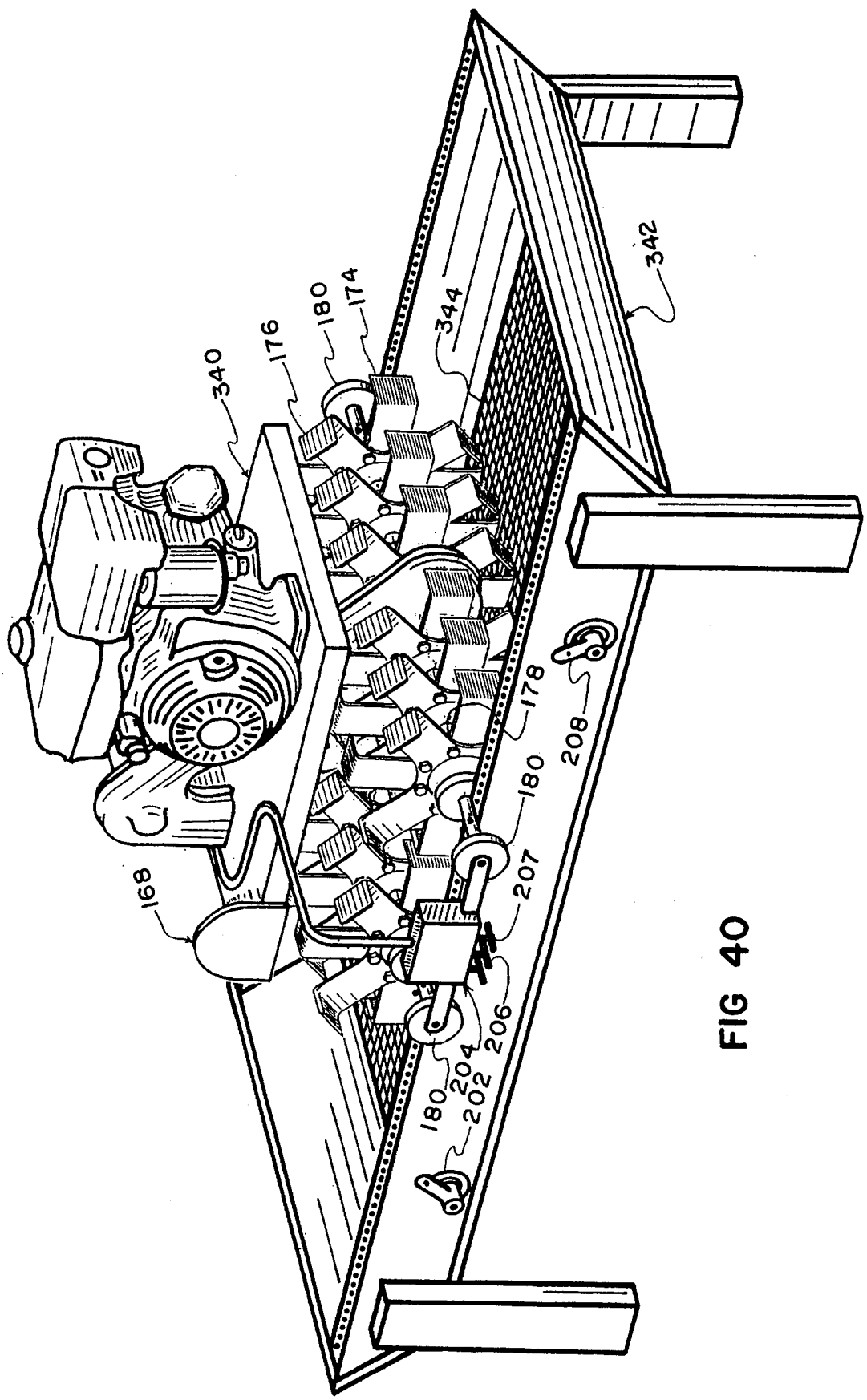
FIG. 40 shows a mixer and separator.

FIG. 40 shows Ramification III an automatic thresher 340. The operator assembles thresher 340 by modifying basic structure 166 as follows: Removing handlebars P156; mounting the same axles and tines used on tiller 320, FIG. 39; entering a set of four axle inserts 180, FIG. 14 into the ends of two axles 178; nonrotatably attaching two of the set of four inserts 180 to one of two axles 178; allowing the remaining two inserts of set 180 to rotate freely within the remaining axle 178; mounting a flexible cable activator 204, FIG. 22b on the ends of insets 180; attaching a cable in activator 204 to clutch assembly 58, FIGS. 2 and 3; building an elevated sluice box 342; and attaching a pair of spring loaded stops 202, FIG. 22a and 208 FIG. 22c to a side of sluice box 342, thereby, completing the assembly of an agitator 168.

The operator threshes beans, for example, by loading sluice box 342 with dried bean stalks, starting the engine, and moving clutch 58 from neutral. Agitator 168 moves slowly along the upper edges of sluice box 342 due to friction between the edges and the axle inserts 180. Tines 174 and 176 glide over perforated grid 344 and churn the bean stalks so that freed beans drop through grid 344. When agitator 168 nears an end of sluice box 342, a rigid inverted "T" boss 207 FIG. 22b, for example, contacts spring loaded stop 208, which turns clockwise until it clears boss 207. The spring then drives stop 208 against a bell crank 206 FIG. 22b attached to a cable wire terminating in clutch assembly 58. There rotation reverses and agitator 168 moves to the opposite end of sluice box 342 where reversing is repeated. Different tine arrangements and sluice box designs make possible a wide variety of mixing and separating activities.

Figure 41:
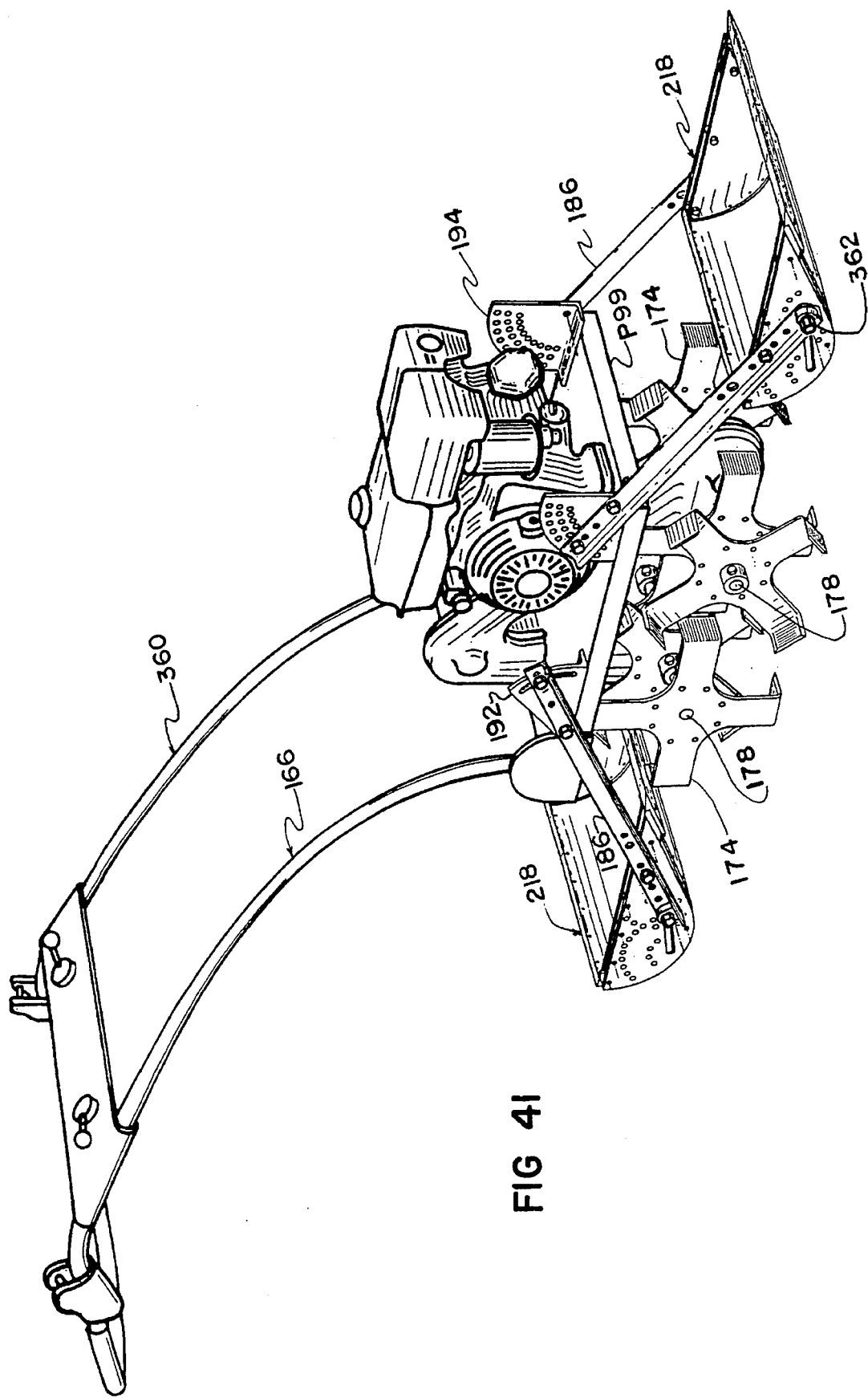
FIG. 41 shows a wet lands tiller.

FIG. 41 shows Ramification IV a counterrotating wet lands tiller 360. The operator assembles tiller 360 by mounting the following components on basic structure 166: pair of axles 178 in shafts 102 and 104; tines 174 FIG. 12a on axles 178; a pair of rear flanges 192, FIG. 18, and a pair of front flanges 194, FIG. 19, on frame P99; a pair of support bars 186, FIG. 17, on each pair of flanges 192 and 194; and a single blade 218, FIG. 28 rigidly on each pair of support bars 186.

Figure 28:
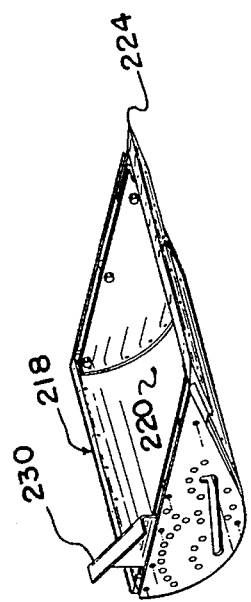
FIG. 28 shows a single blade.
Figure 31:
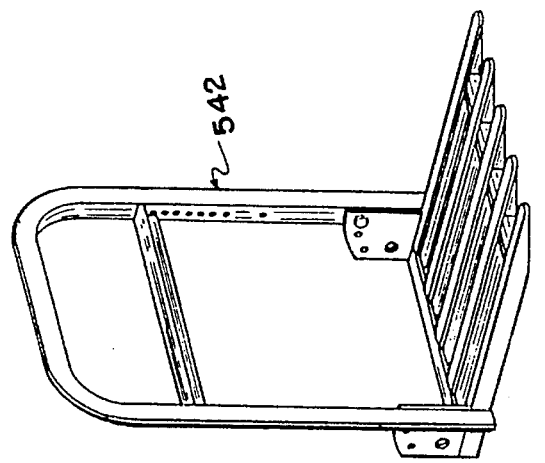
FIG. 31 shows a fork lift rack.
Figure 30:
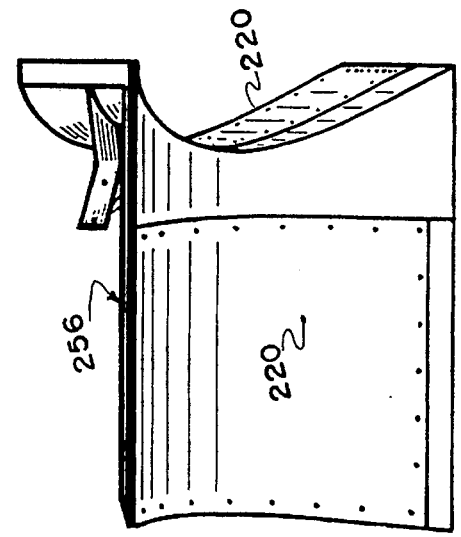
FIG. 30 shows a snow plow.
Figure 27:
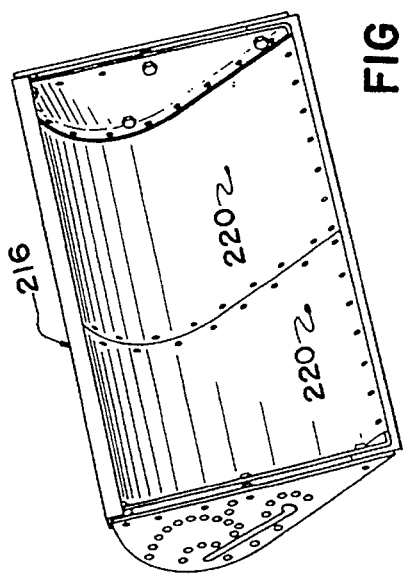
FIG. 27 shows a double blade.
Figure 29:
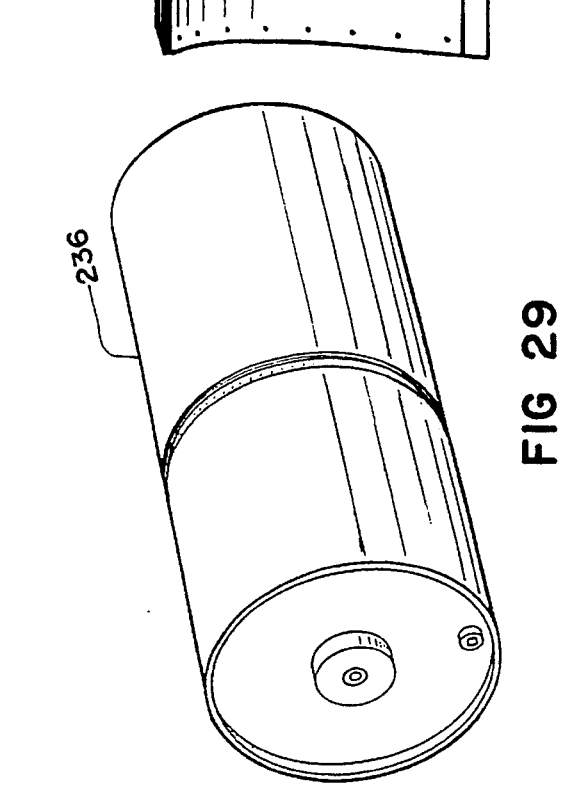
FIG. 29 shows a roller.
Figure 32:
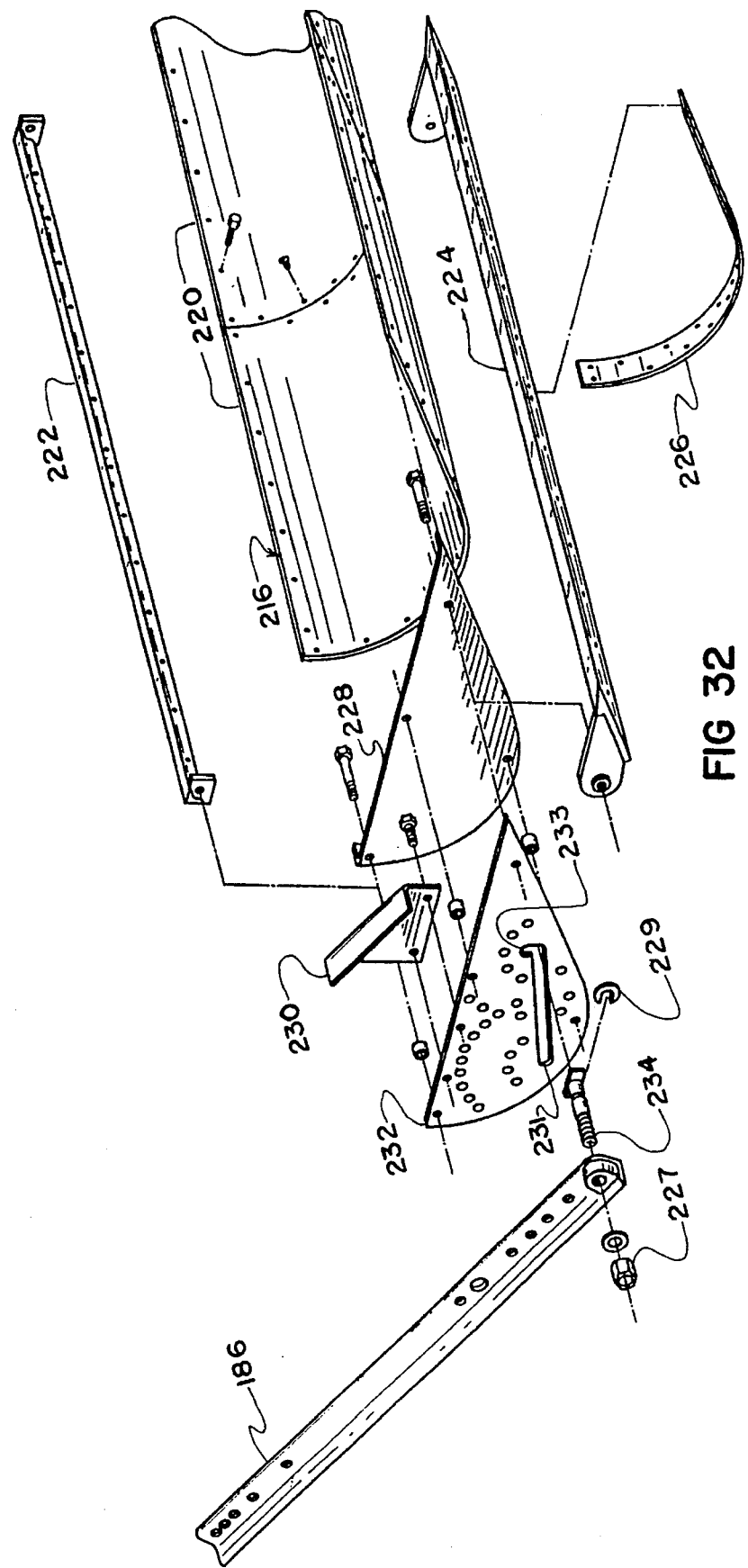
FIG. 32 shows exploded views of blades.

Although FIG. 32 shows details of a double blade 216, details of single blade 218, FIG. 28 become apparent when a stabilizer 222 and a scraper 224 FIG. 32 are shortened and a body 220 with a connecting strap 226 are deleted. Bolts join remaining body 220 of rolled sheet metal to a pair of steel end plates 228 and end plate covers 232. Scraper 224 and stabilizer 222 of appropriate length provide rigidity. Bolts 362 prevent front and rear single blades 218 from turning relative to frame P99.

Tiller 360 operates on wet lands or over slurries of mud that would bog down an ordinary tiller. Horizontal blades 218 provide buoyancy so that the operator can push the machine over land submerged in one or two inches of water such as rice paddies. Tiller 360 also operates well in ordinary gardens to dislodge clumps of grass when the soil is saturated with water.

Figure 42:
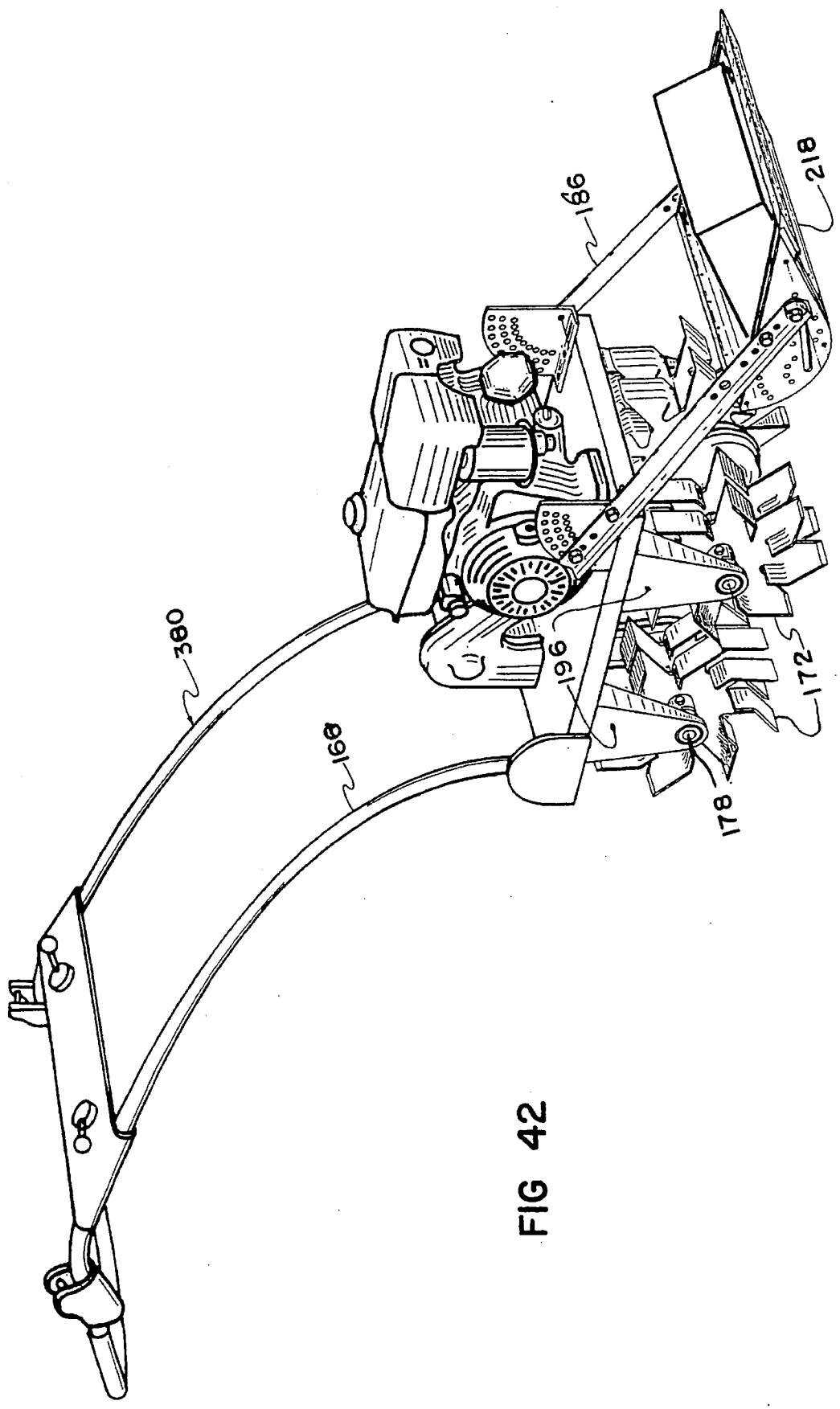
FIG. 42 shows a counterrotating tiller for hard ground.

FIG. 42 shows Ramification V a ballasted counterrotating chisel plow 380. The operator assembles plow 380 by mounting chisel tines 172 on axles 178 and supporting the ends with two pair of axle braces 196. He adjusts single blade 218 as described for tiller 360, FIG. 41.

Chisel Plow 380 operates on ground that is too hard for existing tillers where chopping mulch into the surface is required. The counterrotation provides the operator with a means of adjusting forward progress by tilting the machine on the tines. He controls depth by using ballasted blade 218 as a fulcrum.

Figure 43:
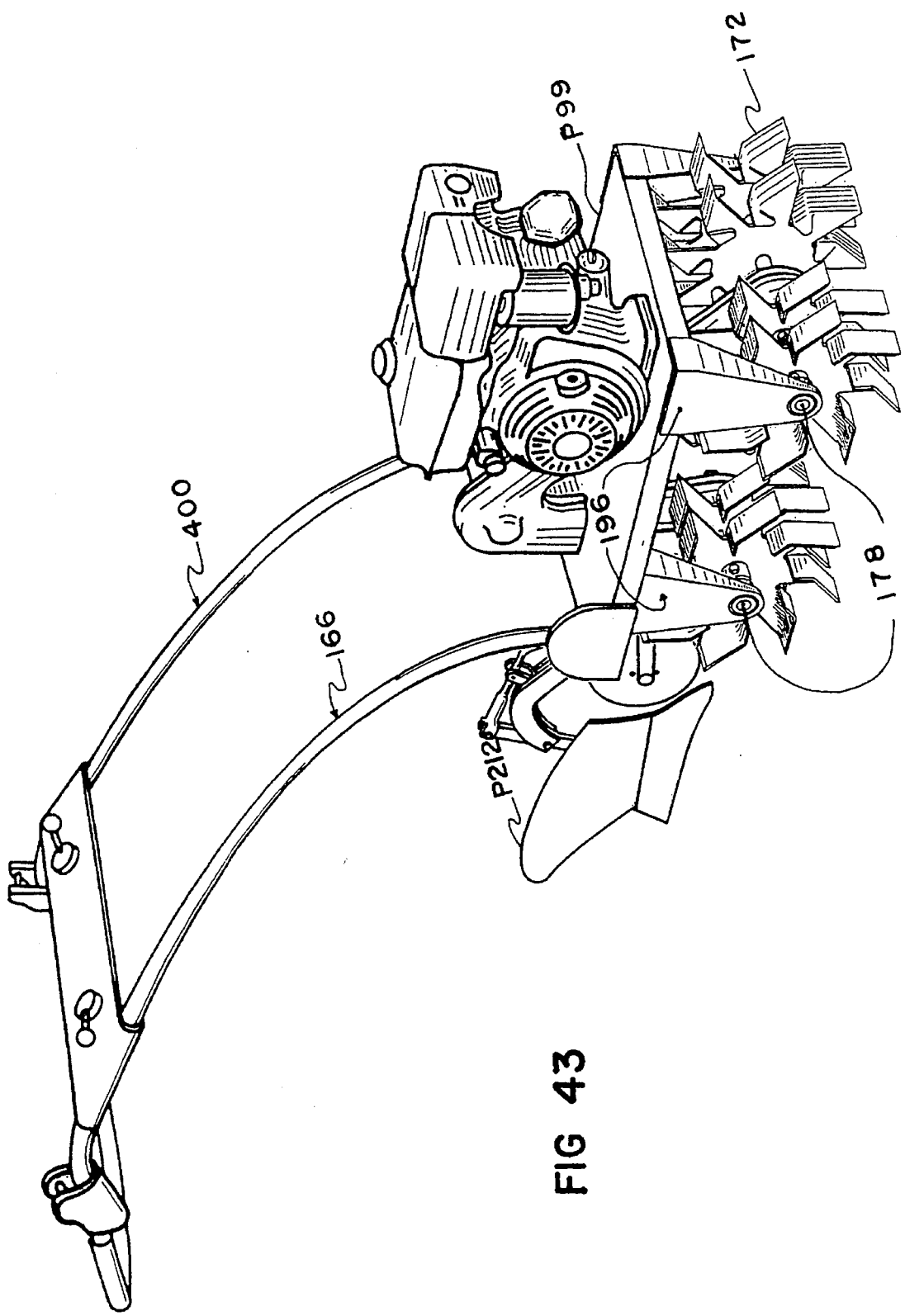
FIG. 43 shows a combined moldboard and chisel plow.

FIG. 43 shows Ramification VI a like rotating chisel plow pulling a moldboard plow P212, FIG. 23, yielding a combination plow 400. The operator assembles plow 400 by attaching the following components to basic structure 166: a pair of axles 178 to shafts 102 and 106 FIG. 2; an array of chisel tines 172 oriented for like rotation on axles 178; two pairs of corner braces 196 to the ends of axles 178 and to the four corners of frame P99; and plow P212 to the rear of frame P99. Operation of plow 400 provides both a chisel action of the surface and the deep draft of a moldboard plow.

Figure 44:
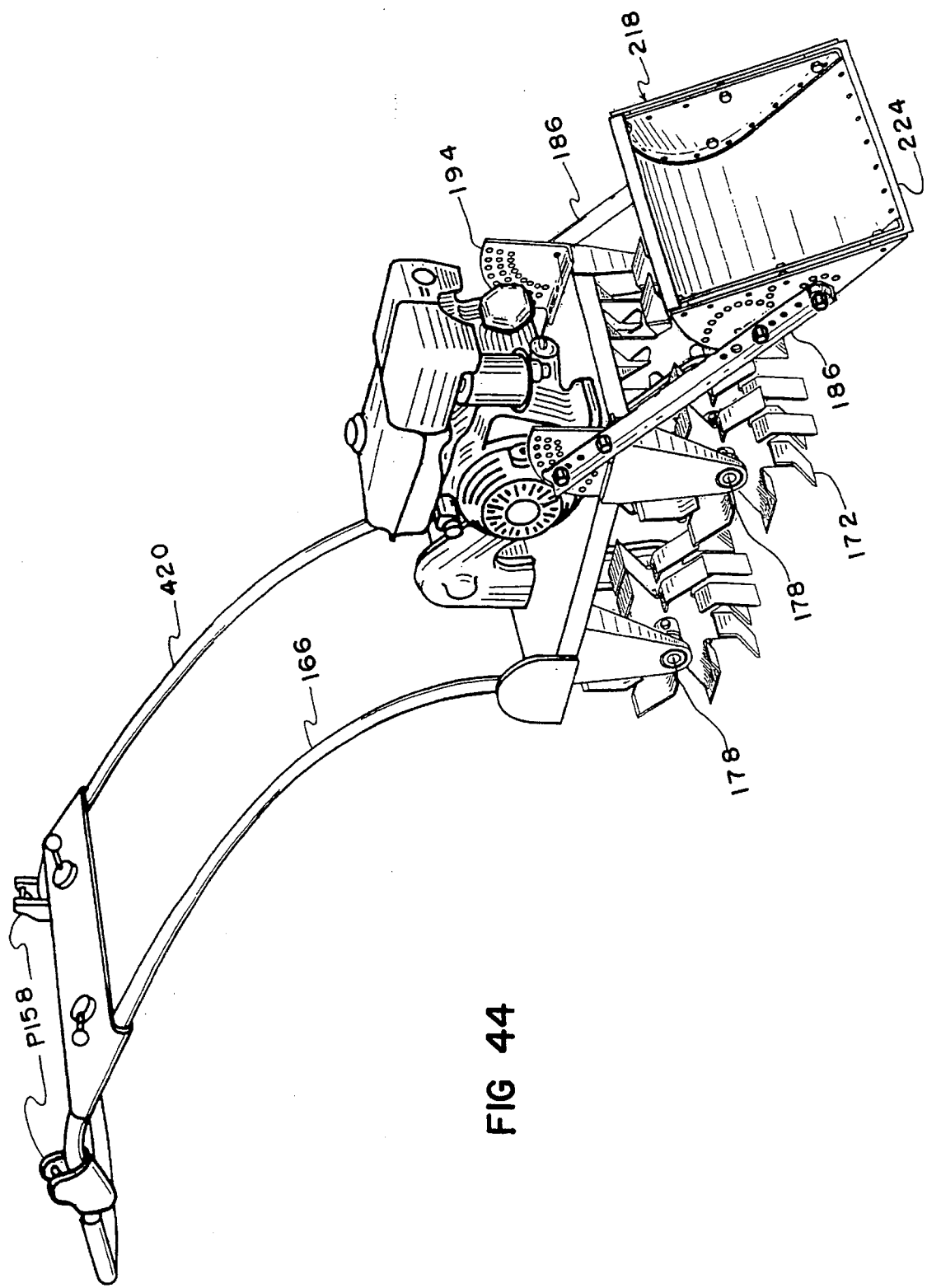
FIG. 44 shows a grader.

FIG. 44 shows Ramification VII a grader 420. The operator assembles grader 420 by: removing moldboard plow 212 from plow 400 Ramification VI; and installing single blade 218 at a steep angle as described for Ramifications IV and V.

The operator grades in a forward and backward action initiated by reversing direction of rotation of like rotating tines 172. On the first pass over an area to be graded he tilts the machine forward so that leading edge 224 of blade 218 FIG. 28 rests on the ground. This provides resistance to tines 172 which dislodge some material. On the second pass blade 218 penetrates deeper, since the surface has been roughened and loosened in the first pass. This increases resistance to tines 172 causing increasing amounts of material to be dislodged with each pass. Finally, the operator reaches equilibrium between what is graded by blade 218 and what is loosened by tines 172.

Figure 45:
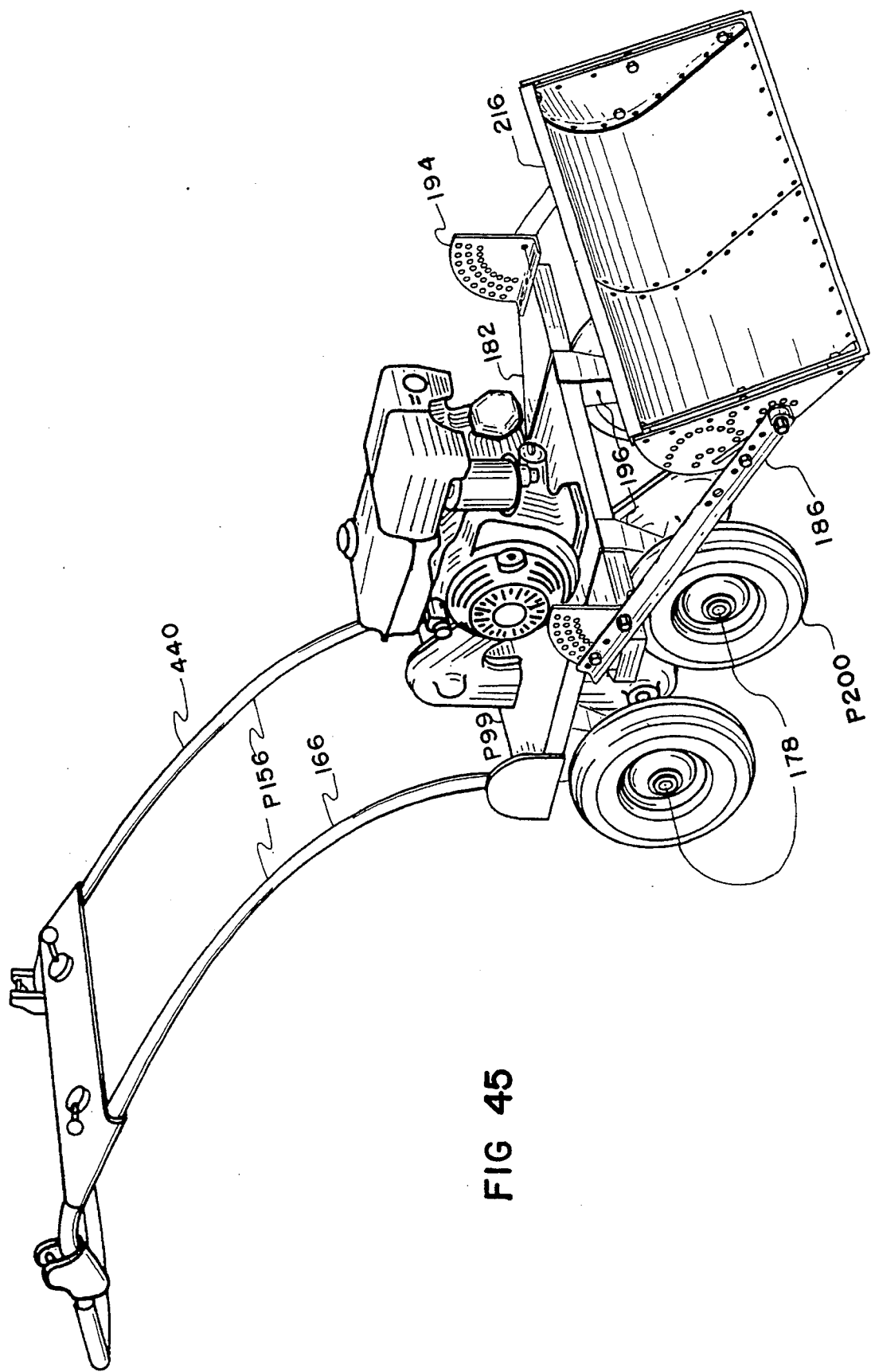
FIG. 45 shows a snow dozer.

FIG. 45 shows Ramification VIII a snow dozer 440. The operator assembles dozer 440 by attaching the following components to basic structure 166: two axles 178 to shafts 102, 106 FIG. 2; two pairs corner braces 196 to the ends of axles 178 and to the corners of frame P99; one pair of wheels P200 nonrotatably keyed to each of two axles 178 on the outside of braces 196; extension 182 to front corners of frame P99; flanges 194 to extension 182; bars 186 to flanges 194; a double blade 216 FIGS. 27 and 32, nonrotatably to bars 186.

The operator uses dozer 440 to sweep large areas of light material such as snow, brush, leaves, and pine needles. Since all four wheels are powered and readily reversed, he successfully sweeps rolling terrain by raising and lowering handle bars P156 in repeated passes.

Figure 46:
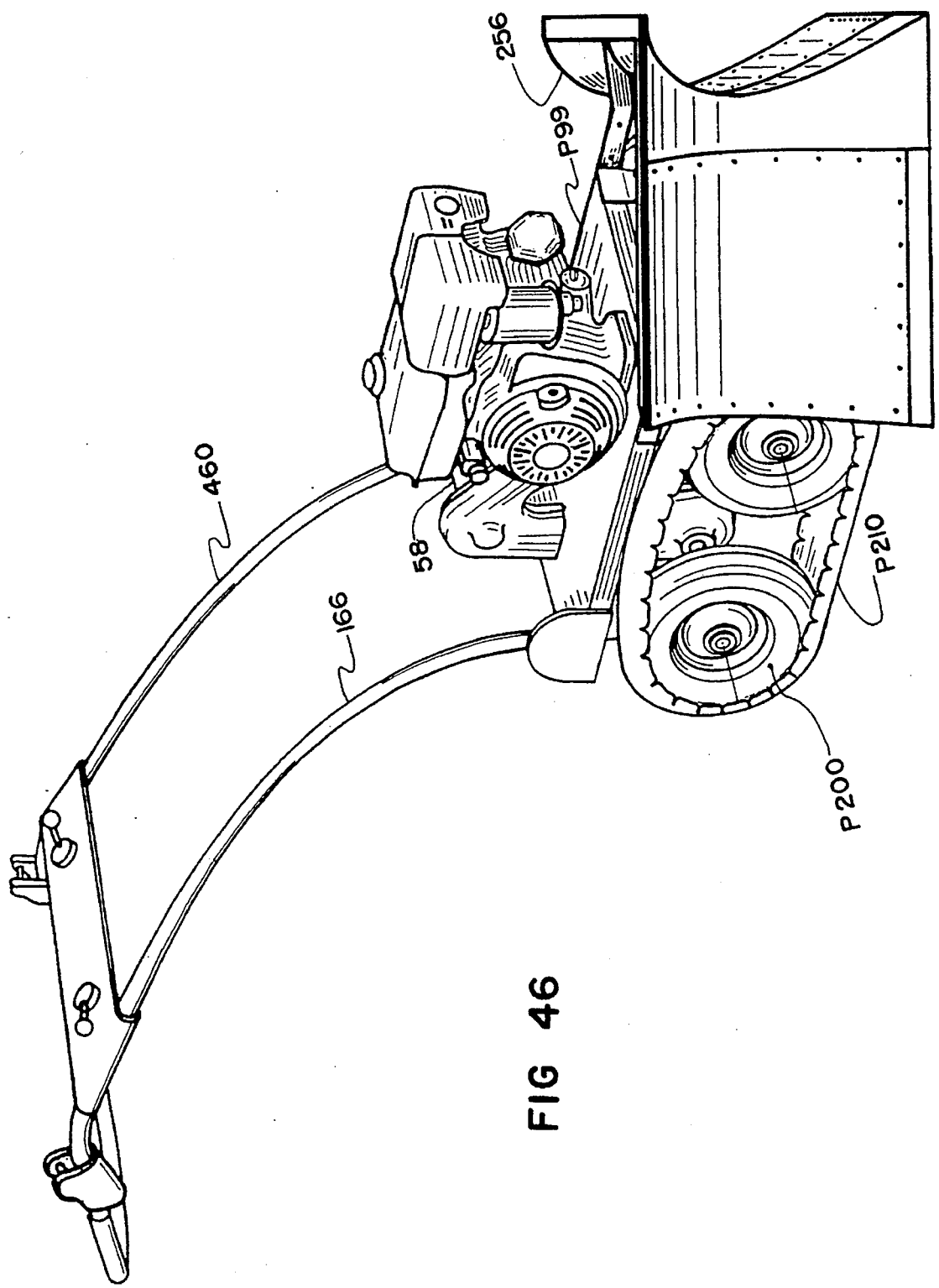
FIG. 46 shows a snow plow.

FIG. 46 shows Ramification IX a snow plow 460. The operator assembles plow 460 by installing a pair of wheel tracks P210 on wheels P200 and mounting a snow blade 256 at the front of frame P99. Several manufacturers supply track P210 which could be made from molded rubber, fiber glass and resin, or a :simple tire chain. Refer to Lockheed Missile and Space Co., Inc., 4800 Bradford Drive, N.W., Huntsville, Ala. 35816, (205)722-4000. Plow 460 cuts a path through deep snow. Reversing clutch 58 enables the operator to repeatedly hit a snow drift.

Figure 47:
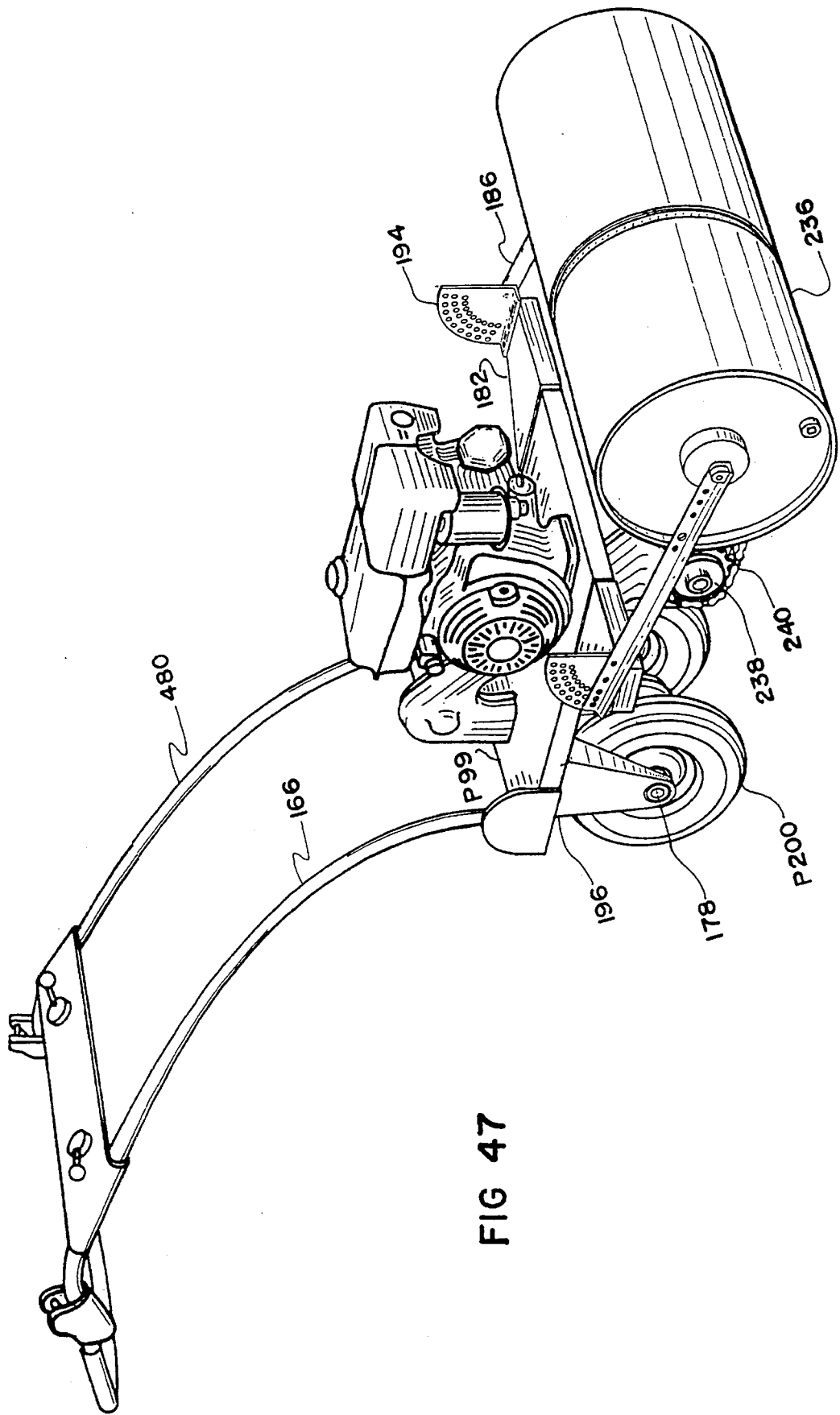
FIG. 47 shows a powered roller.

FIG. 47 shows Ramification X a powered roller 480. The operator assemblies roller 480 by attaching the following components to basic structure 166: axle 178 to shaft 102; a pair of wheels P200 free to rotate on axle 178 by tile removal of keys 198 FIG. 21; braces 196 to axles 178 and frame P99; extension 182 to frame P99; flanges 194 to extension 182; Bars 186 to flanges 194; an assembled cylinder 236 FIGS. 29 and 33 to bars 186; a roller chain 240, FIG. 33, to a sprocketed shaft insert 238 and to a sprocket 244 welded on a pair of end plates 246 for a pair of cylinders 250 and 252; and an insert 238 to shaft 106 FIG. 2. Cylinder 236 receives water ballast through ports 254. The operator rolls lawns, asphalt paving, quick drying concrete, etc. on grades.

Figure 48:
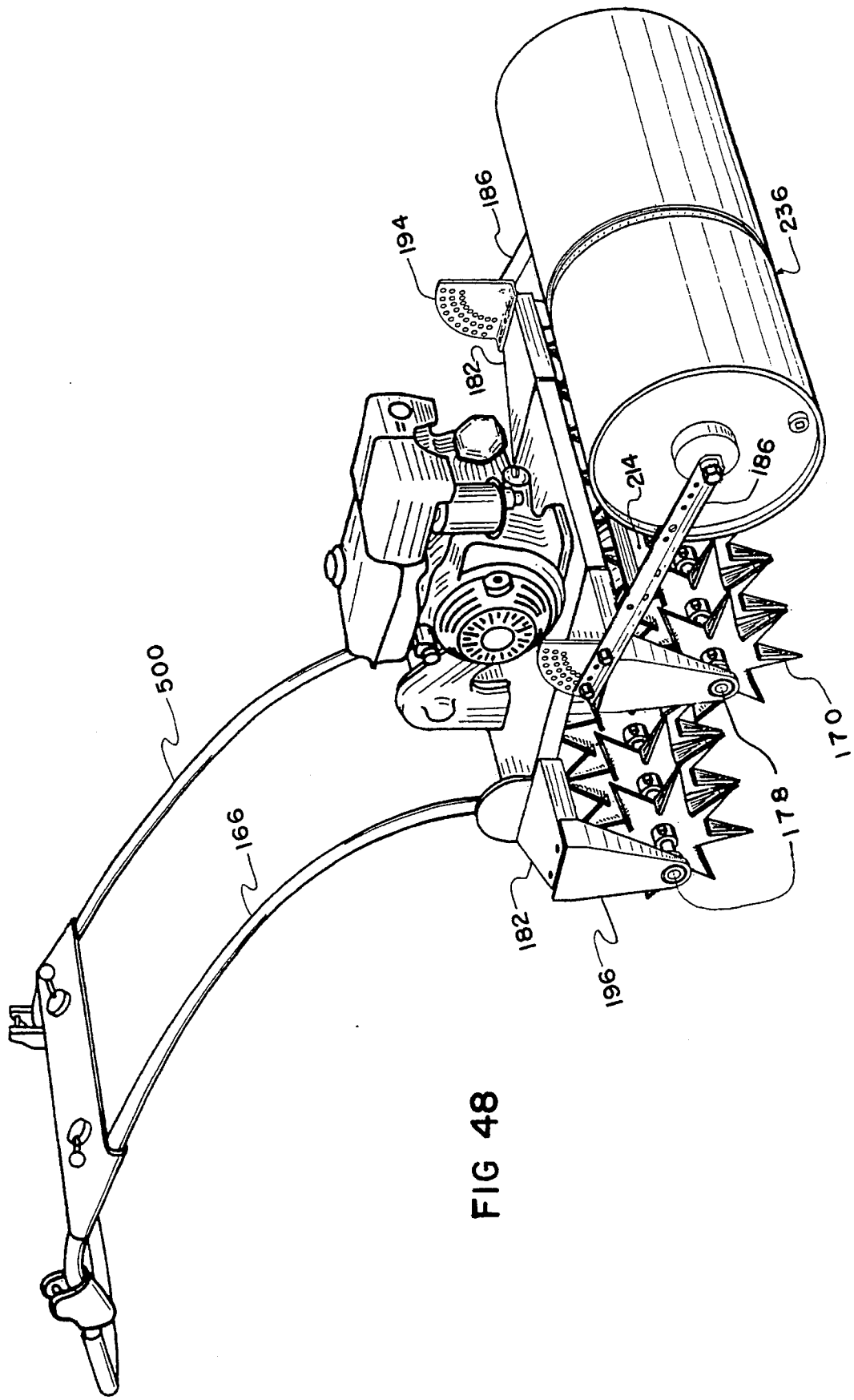
FIG. 48 shows a combined aerator and roller.

FIG. 48 shows Ramification XI a combined lawn roller and aerator 500. The operator assembles combination 500 by: setting axles 178 onto like rotating shafts 102 and 106 FIG. 2; mounting an array of aerating tines 170 on axles 178; reinforcing axles 178 with braces 196 and rear extensions 182; mounting roller 236 for free rotation on front extension 182 through flanges 194, braces 196, bars 186, and a channel 214, FIG. 26. Aerating tines 170 in penetrating the ground provide ample friction to propel combination 500 and control it on grades.

Figure 49:
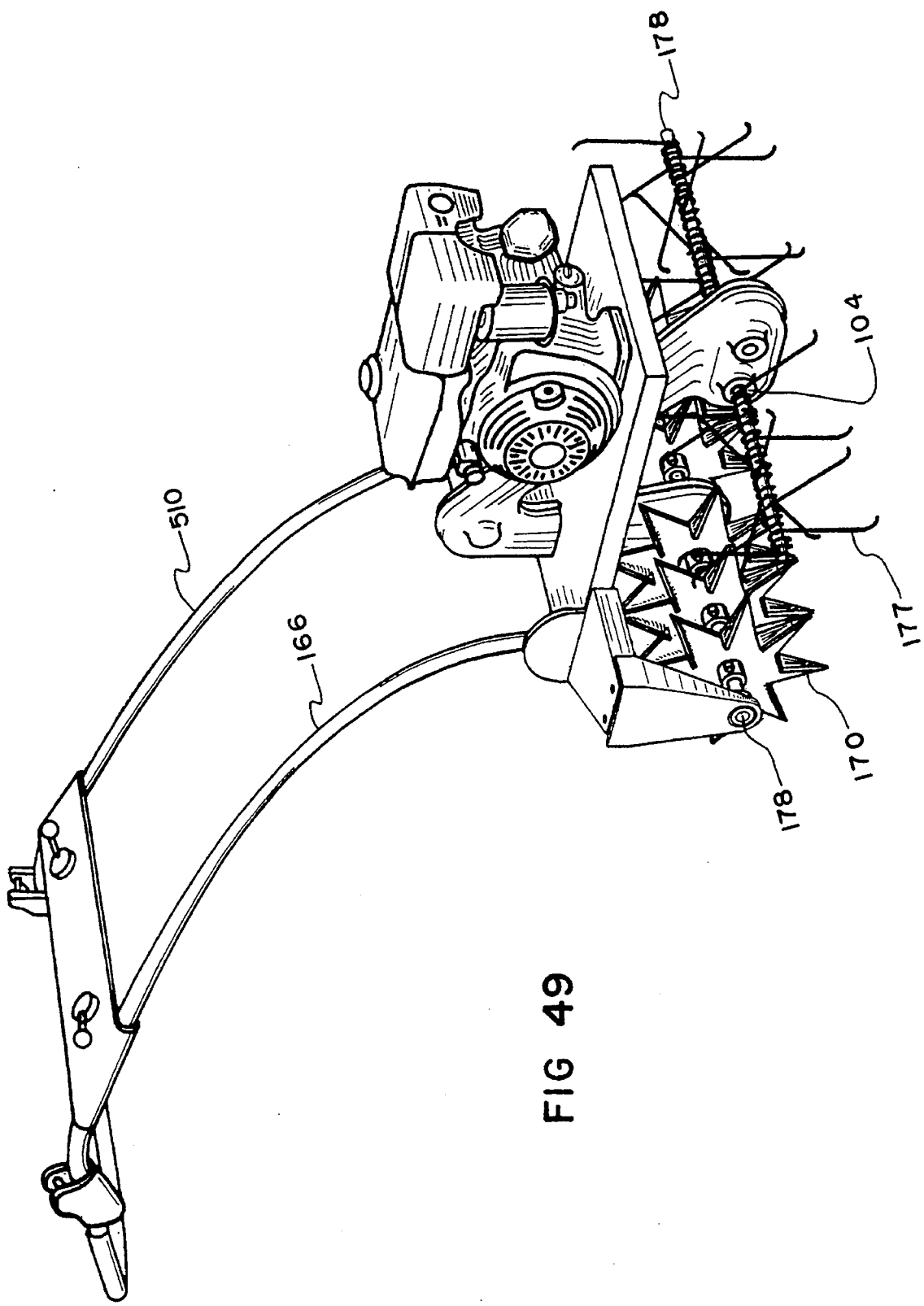
FIG. 49 shows a combined aerator and dethatcher.

FIG. 49 shows Ramification XII a combined aerator and dethatcher 510. The operator assembles aerating dethatcher 510 by attaching the following components to basic structure 166: an array of aerating tines 170 to axles 178 from shaft 102; and a helical array of dethatchment tines 177 FIG. 36 to axle 178 from counter-rotating shaft 104. If the ground to be treated is hard, the operator could attach blade 218 to carry ballast as described for Ramifications IV or V. The operator tilts the machine to favor either the rear aerating tines or the counterrotating dethatchment tines.

Figure 50:
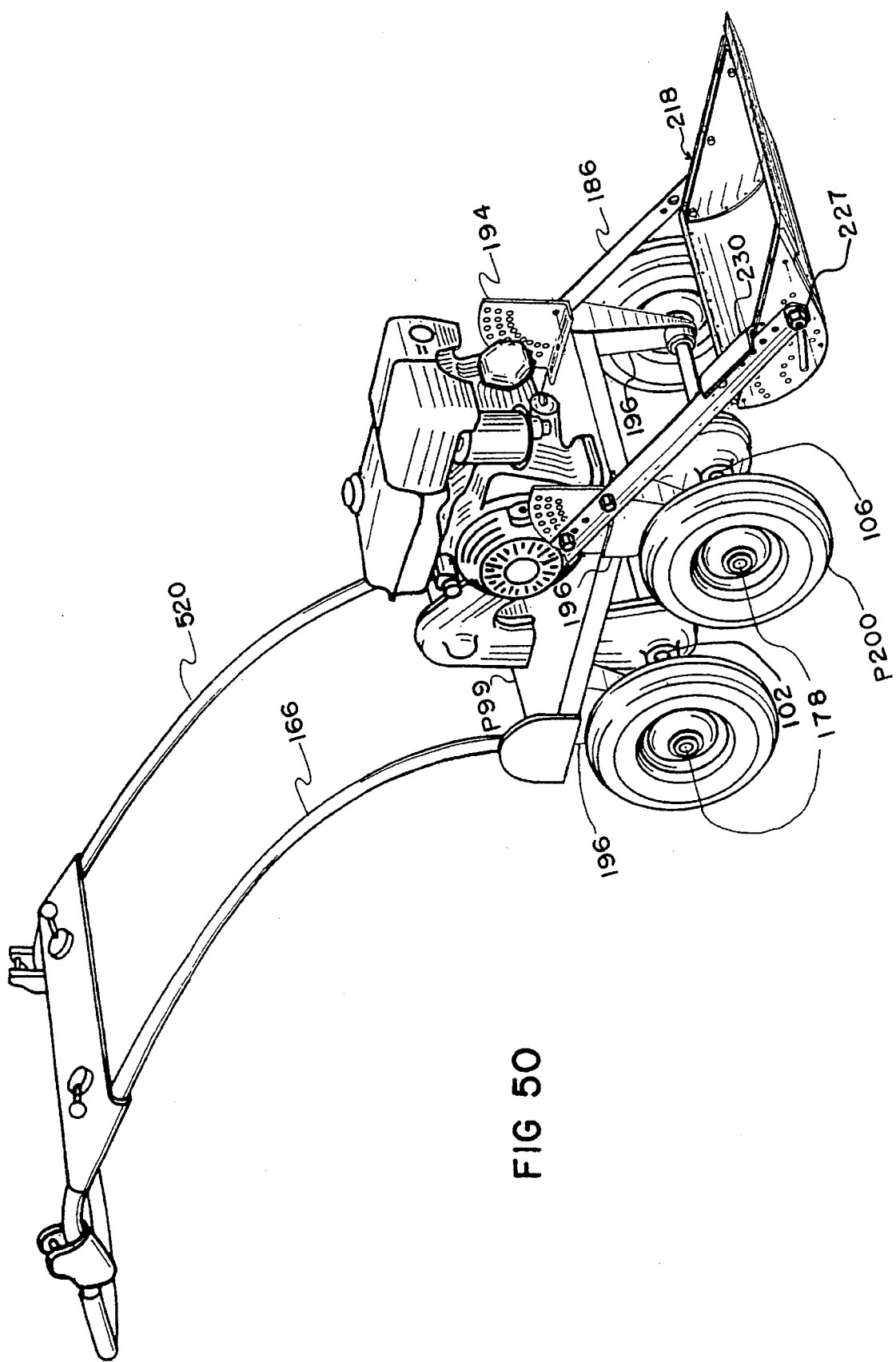
FIG. 50 shows a powered scoop.

FIG. 50 shows Ramification XIII a scoop 520. The operator assembles scoop 520 by attaching the following components to basic structure 166: inserting rear axle 178 in shaft 102 and front axle 178 in like rotating shaft 106; mounting corner braces 196 to the ends of axles 178 and to frame P99; mounting four wheels P200 keyed to the ends of the two axles 178; mounting flanges 194 to frame P99 and bars 186 to flanges 194; and rotatably attaching single blade 218 with a stop 230 to bars 186 through a bolt assembly 234, FIG. 32, on each end of blade 218.

The operator uses scoop 520 to load, transport, and dump any loose material, such as sand, rock, top soil, feed, etc. FIGS. 51*a* to 51*f* define the sequence of operations. FIGS. 51*a* shows scoop 520 enroute to the loading site. FIG. 51*b* shows scoop 520 tilted forward and rammed into a pile of loose material 522. thereby loading blade 218 and forcing bolts 234 on bars 186 into notches 233 at the forward ends of slots 231, FIG. 32. In FIG. 51*c* the operator continues to engage notches 233 by a downward pressure on handlebars P156 and withdraws loaded blade 218 from pile 522 by reversing rotation of wheels P200 at console controls P158 FIG. 1. Since the center of gravity of loaded blade 218 is now rearward of notches 233, blade 218 rotates to stop 230.

In FIG. 51d at the dumping site the operator releases downward pressure on handlebars P156 allowing loaded blade 218 to rest on the ground and thereby disengaging bolts 234 from notches 233. The operator then reverses the machine to draw bolts 234 to the rear of slots 231 against resistance of loaded blade 218 with the ground. In FIG. 51e the operator pivots the machine about rear wheels P200 and dumps the load, since the center of gravity of loaded blade 218 was forward of the rear ends of slots 231. FIG. 51f shows that lowering the machine and running it against the dump returns bolts 234 on bars 186 to the forward ends of slots 231 to engage notches 233. Since the center of gravity of empty blade 218 is now rear of this point of engagement, blade 218 rotates to stop 230 for return to the loading site as shown in FIG. 51a.

FIGS. 52a to 52d show Ramification XIV a fork lift 540. The operator assembles fork lift 540 by attaching the following components to basic structure 166: Two axles 178 inserted in like rotating shafts 102 and 106; four wheels P200 on axles 178 reinforced with braces 196; and a fork lift rack 542, FIG. 31, braced with various lengths of a structural angle 190, FIG. 16, to frame P99.

Figure 52A:
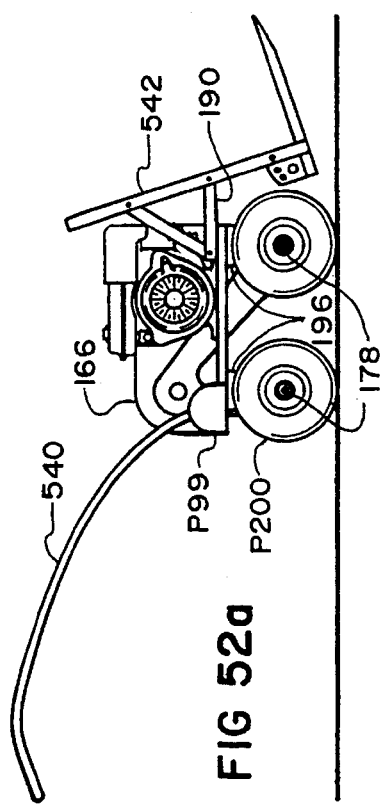
FIGS. 52a to 52d show the sequence of operations for a powered hand truck.
Figure 52B:
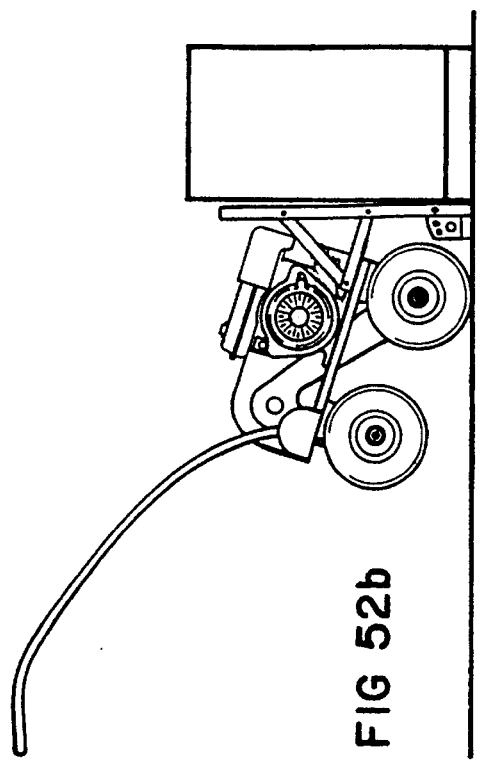
Figure 52C:
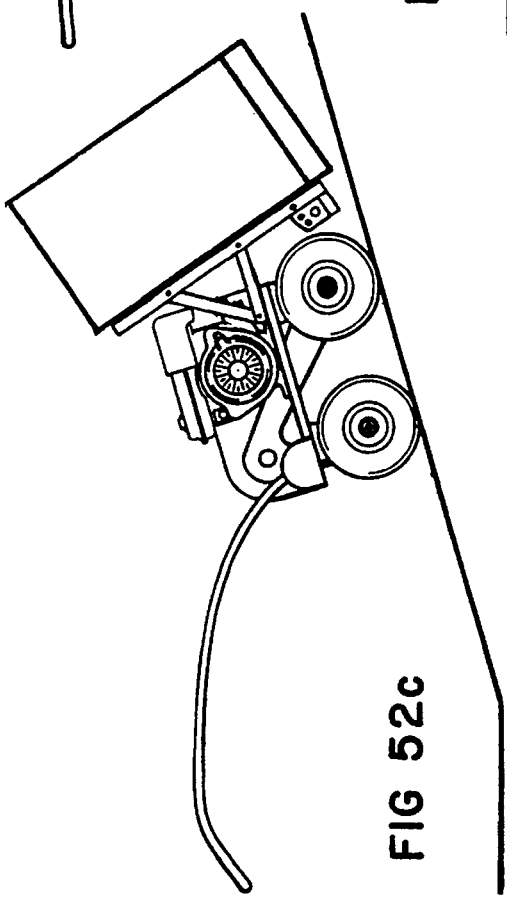
Figure 52D:
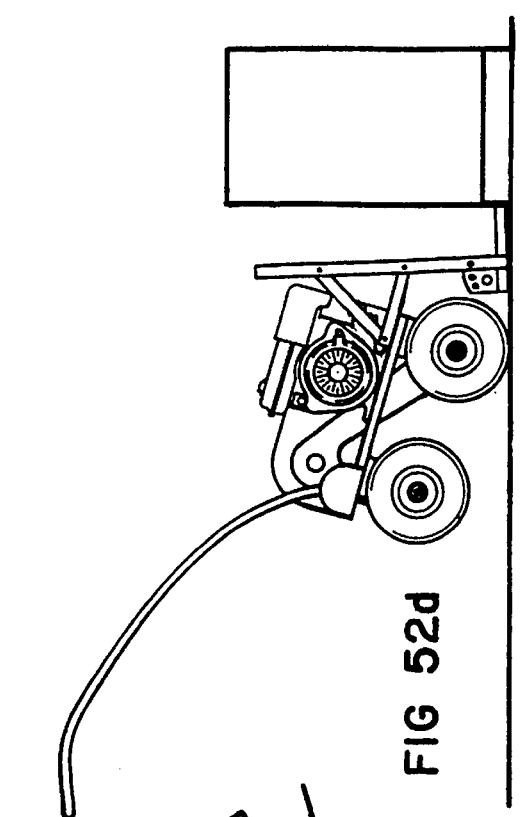

The operator uses fork lift 540 primarily to move palleted loads. Since four wheels 200 are powered, he traverses inclines and maneuvers in small area with comparative ease. FIGS. 52a to 52d show the operations for loading, moving and unloading. FIG. 52a shows lift 540 enroute to the work site. FIG. 52b shows lift 540 tilted on the front wheels and inserted under a loaded pallet. FIG. 52c illustrates moving the load on an incline. FIG. 52d shows the unloading procedure.

Since lift 540 inherently contains a significant source of rotary power and a supporting rack, many types of power consuming appliances can be carried and operated. One example is the cross country sprayer in FIG. 53. Rack 542 is supported by a third pair of wheels P200, belted to the front pair by track P210. The load is made up from a pump P546 with inlet inserted in a fluid container P544 and outlet connected to a hose reel P550. Since all six wheels P200 are powered, lift 540 quickly traverses rough terrain to a fire fighting site for example. There the operator attaches pump 546 to engine output pulley 152, FIG. 1, via a V-belt P548, FIG. 53 and delivers a forceful, high trajectory stream. Another example is a shredder P555 shown in FIGS. 34 and 54. Many types of shredders without engines are available for mounting, such as item 71BF79787N in Sears Farm and Ranch catalog 1991–1992. The opposite end of a shaft P557 is powered by a V-belt P559 from pulley P152 FIG. 1 on engine P164. Other examples are generators for remote electric power and blowers for dusters and vacuums.

Figure 55:
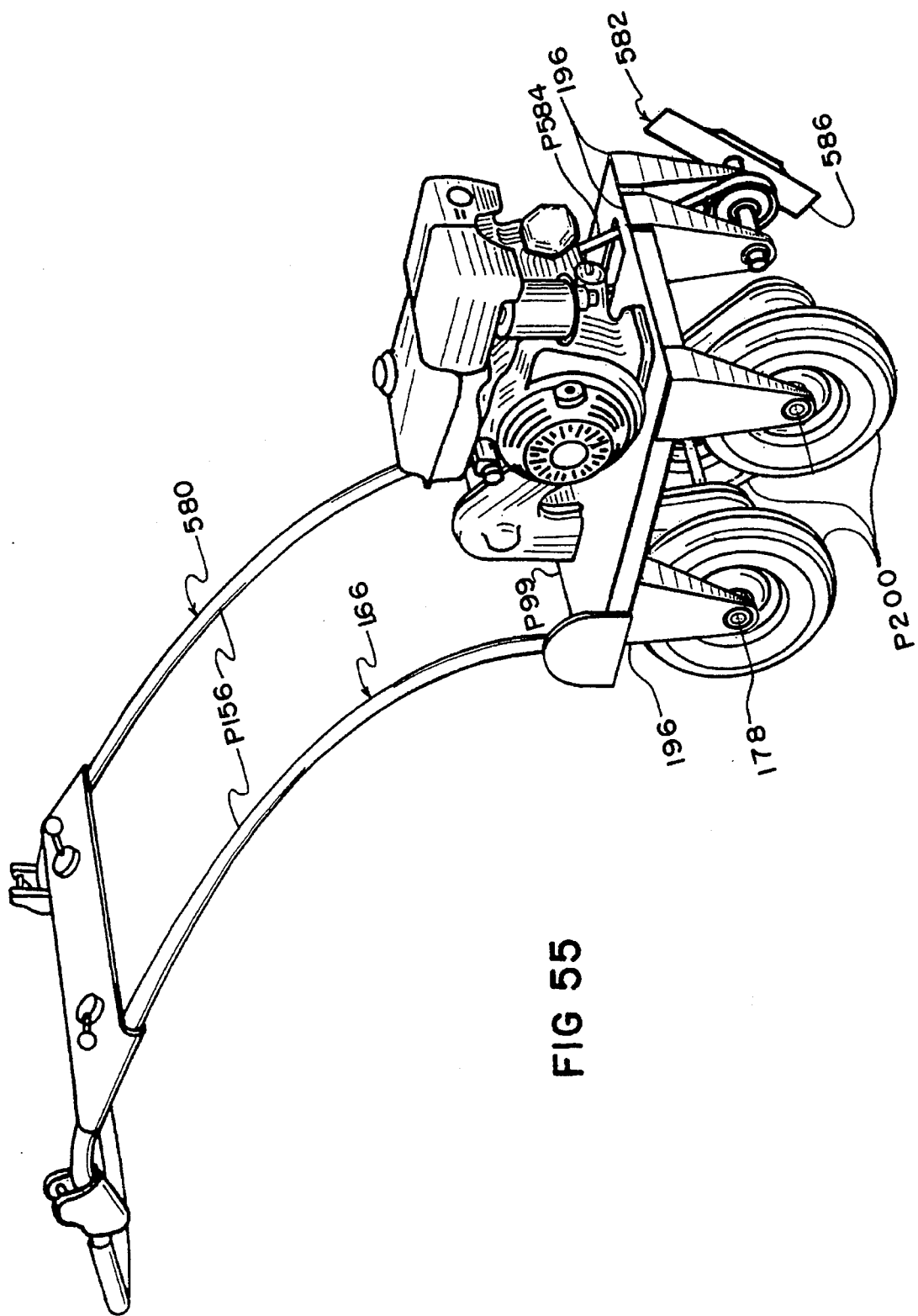
FIG. 55 shows an edger.

FIG. 55 shows Ramification XV an edger, 580. The operator assembles edger 580 by attaching the following components to basic structure 166: three freely rotating wheels P200 to axles 178 supported by three corner braces 196 and shafts 102 and 106. Two additional corner braces 196 support an edger subassembly, 582, FIG. 35 on frame P99. Engine output pulley 152, FIG. 1 drives a V-belt, P584 powering edger blade 586. The operator raises blade 586 by lowering handlebars P156 so that the machine tilts about two rear wheels. He lowers blade 586 by raising handlebars P156 so that the machine tilts about the single wheel at the front of the machine and the rear wheel at the left of the operator.

Figure 56:
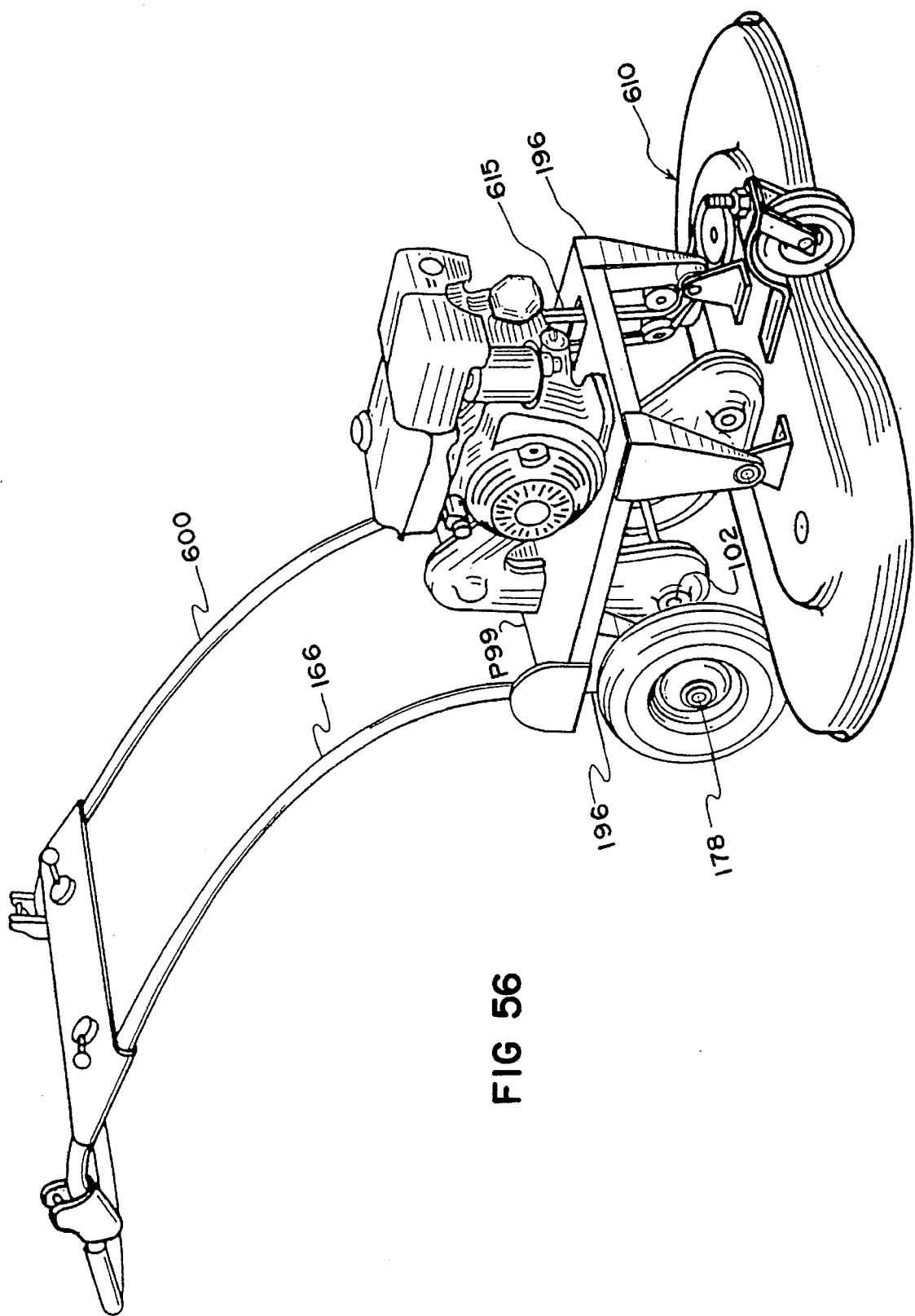
FIG. 56 shows a self propelled mower.

FIG. 56 shows Ramification XVI a mower 600. The operator assembles mower 600 by attaching the following components to basic structure 166: A pair of powered wheels P200 to shaft 102 through axile 178 supported by a rear pair of corner braces 196; and a mower deck, 610, to a front pair of corner braces, 196. A V-belt, P615 from engine output pulley 152, FIG. 1 powers mower deck 610.

ADVANTAGES

My invention provides several advantages for walking attendants and their suppliers. The method reduces capital investment and operating costs, improves performance, and provides new procedures for landscaping and gardening.

Cost savings arise from using the same parts and subassemblies along with a simple, fast method of assembly to incorporate a wide variety of equipment. The operator bolts various combinations of components to a basic structure supporting a single engine. These custom assemblies yield at least a tiller, grader, mower, shredder, edger, and snow removers, which include most of the equipment used on the average landscape. A first cost savings obviously results when a single basic structure and a modest collection of components are compared to buying multiple units of single purpose equipment. The single engine employed for all assemblies accounts largely for reduced maintenance and also eliminates a fire hazard. Manufacturers recommend winterizing and refurbishing gasoline engines semiannually and draining fuel tanks after use. Adjustments of gasoline engines will become more critical as pollution requirements increase. Since the operator stores only a basic structure and an inventory of components, he saves much space compared to storing a collection of single purpose machines. The method invented simplifies the buy, rent, or contract issue in that only components and subassemblies need be purchased or rented and transported, when a basic structure is owned. The method adapts well to renting or contracting with a lawn care entrepreneur since the components can be easily transported. A wide variety of components stocked by a dealer or rental agency would stimulate a user to create custom implements for unique problems. Assembly of the ramifications requires little time compared to operating time since the procedures are simple and many parts are standard. For example parts 170, 172, 174, 178, 182, 186, 190, 192, 194, 196, P200, P210, 216, 218, 220, 228, 232, 236, and 592 appear repeatedly in the assemblages of components as well as ramifications. Therefore, my invention reduces capital investment, maintenance, storage, and transportation for the manufacturer, middleman, dealer, renter, servicer, and lawn care entrepreneur as well as the home owner.

The present invention shows superior performance for the ramifications that till, grade, and edge; compared to existing walk-behind equipment. The tiler shown in FIG. 42 better attacks hard ground particularly when ballast is carried. The grader shown in FIG. 44 out performs a blade on a rear tine tiller in that it can be manipulated faster particularly on small areas. The edger shown in FIG. 55 demonstrates faster, more accurate response to raising and lowering tile cutting blade since the operator retains both grips on the handle bars rather than releasing one hand to manipulate a lever. General superiority occurs in less weight and envelop.

My present invention provides methods for assembling machines to be used on tasks never before attempted with walk behind equipment. The drawings and description show these tasks to be a mixer and separator particularly adapted to mixing low water to cement ratio concrete or separating rock from top soil; a wet lands tiler for a garden saturated with water; a combined chisel and moldboard plow; powered lawn roller; combinations for aerating, rolling and dethatching; self propelled shredder; and powered scoop and hand truck that picks up material, transports it cross country and dumps it in response to manual controls.

Figure 53:
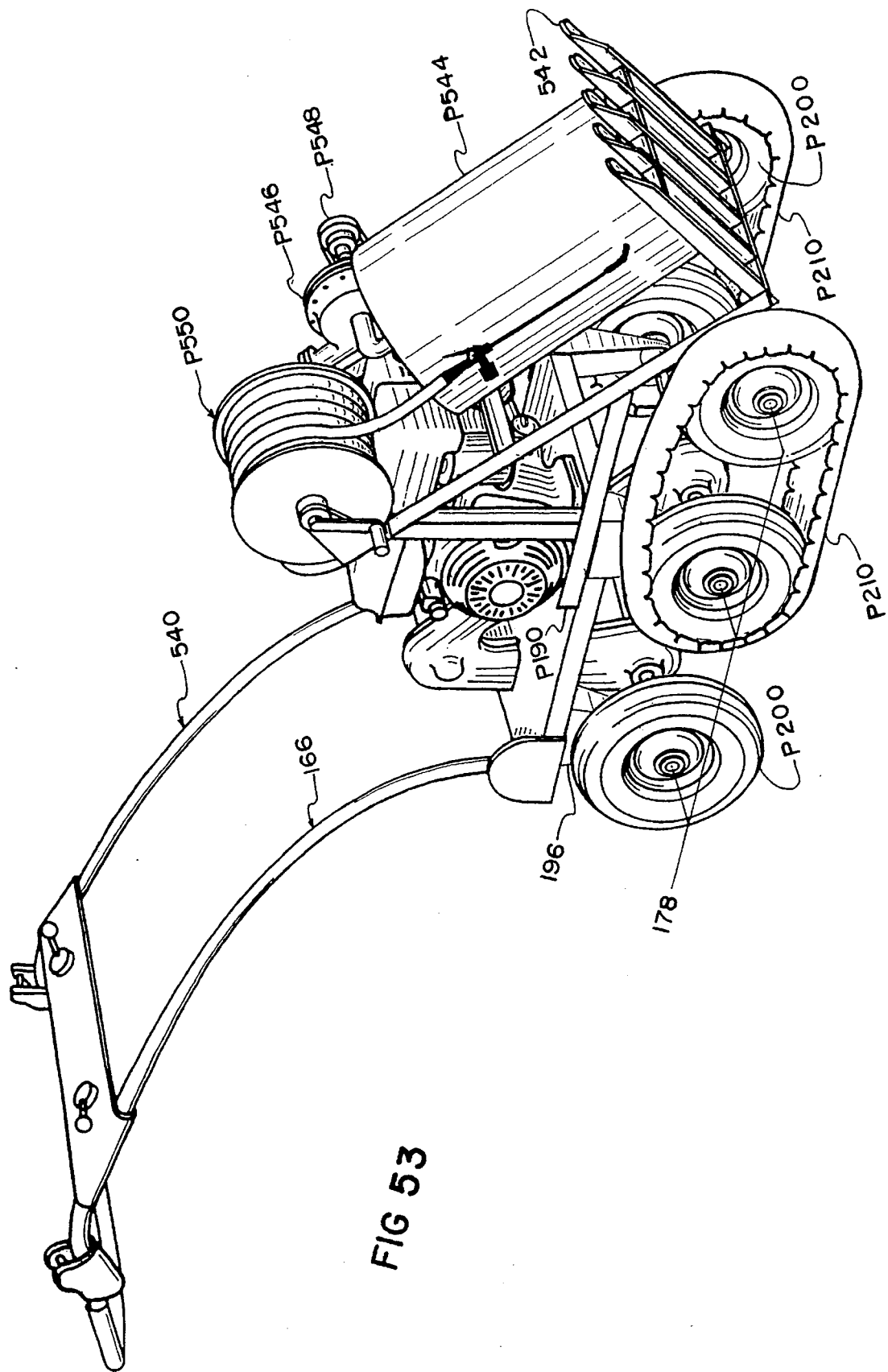
FIG. 53 shows a cross country sprayer.
Figure 54:
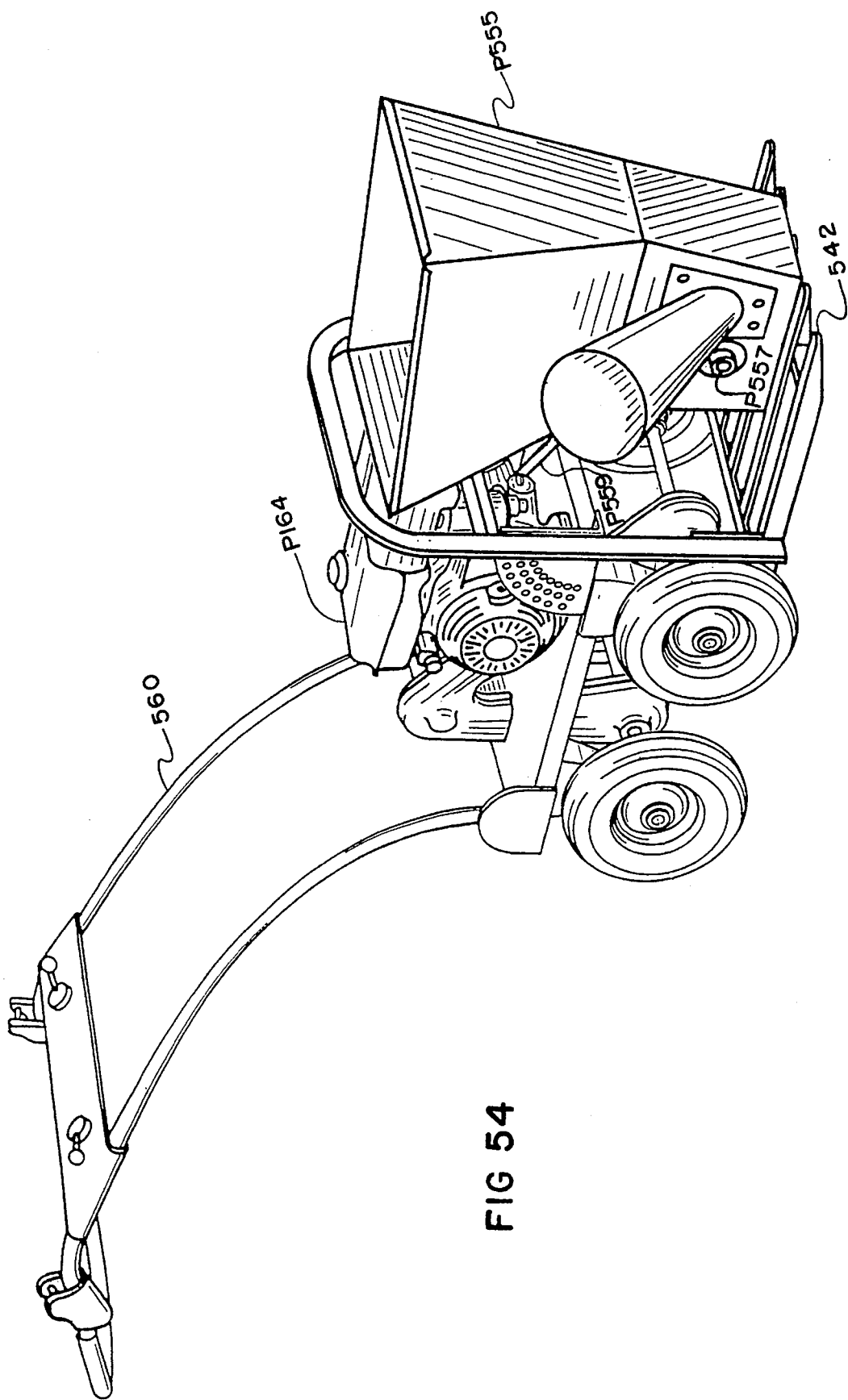
FIG. 54 shows a self propelled shredder.

An advantage of the cross country transportation mentioned is particularly interesting. When a forest fire threatens the vicinity, the powered hand truck can be rigged with a sprayer as shown in FIG. 53 and held in readiness to move cross country to attack small fires. Also, the rack can be loaded with camping gear and a disassembled sluice box, for example, to go across country to set up a mining operation. At the camp site a pump or generator can be supported by the rack and belted directly to the engine output shaft. The method provides many elements for recreational activities.

Figure 3:
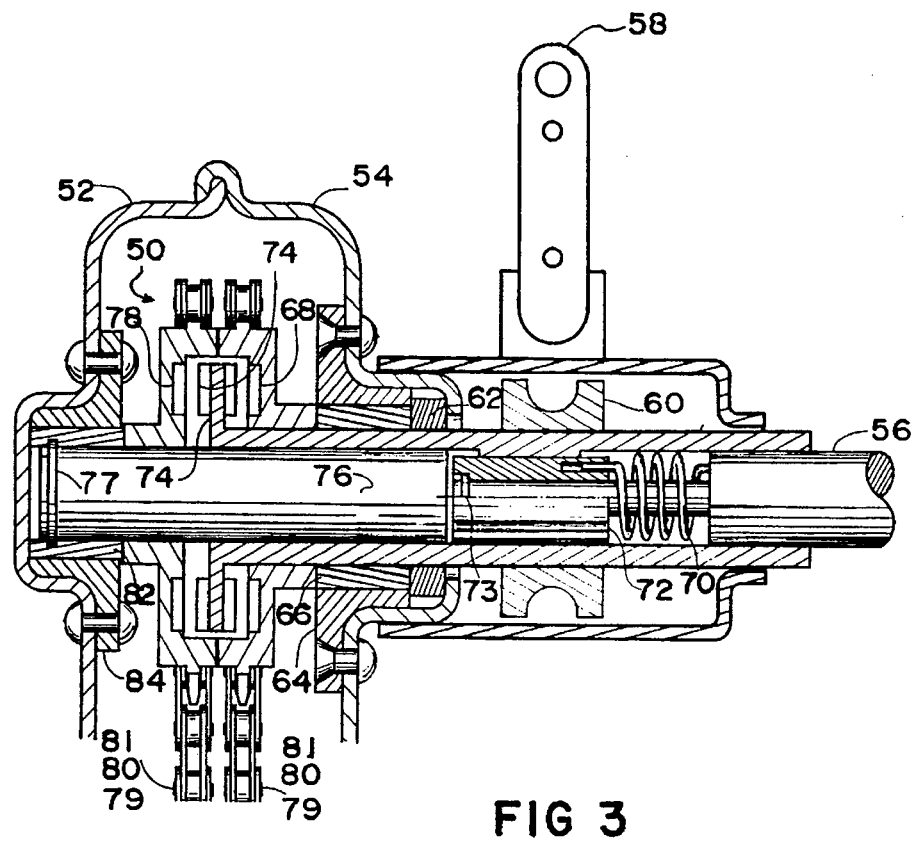
FIG. 3 shows details of the clutch in FIG. 2 and section 3—3 FIGS. 8 and 9.
Figure 4:
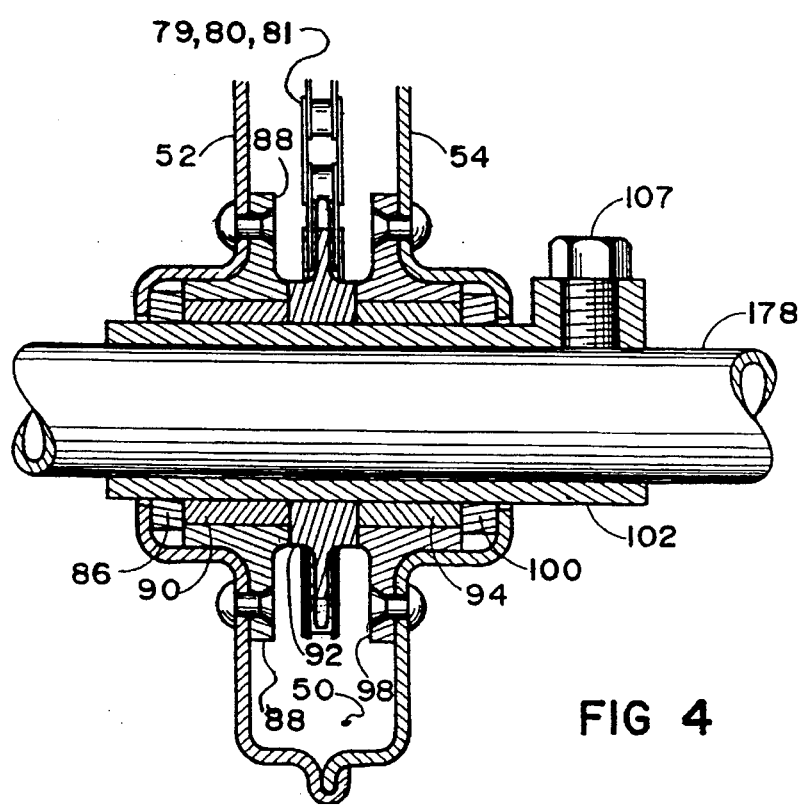
FIG. 4 shows details of the rear wing in FIG. 2 and section 4—4 FIGS. 8 and 9.
Figure 5:
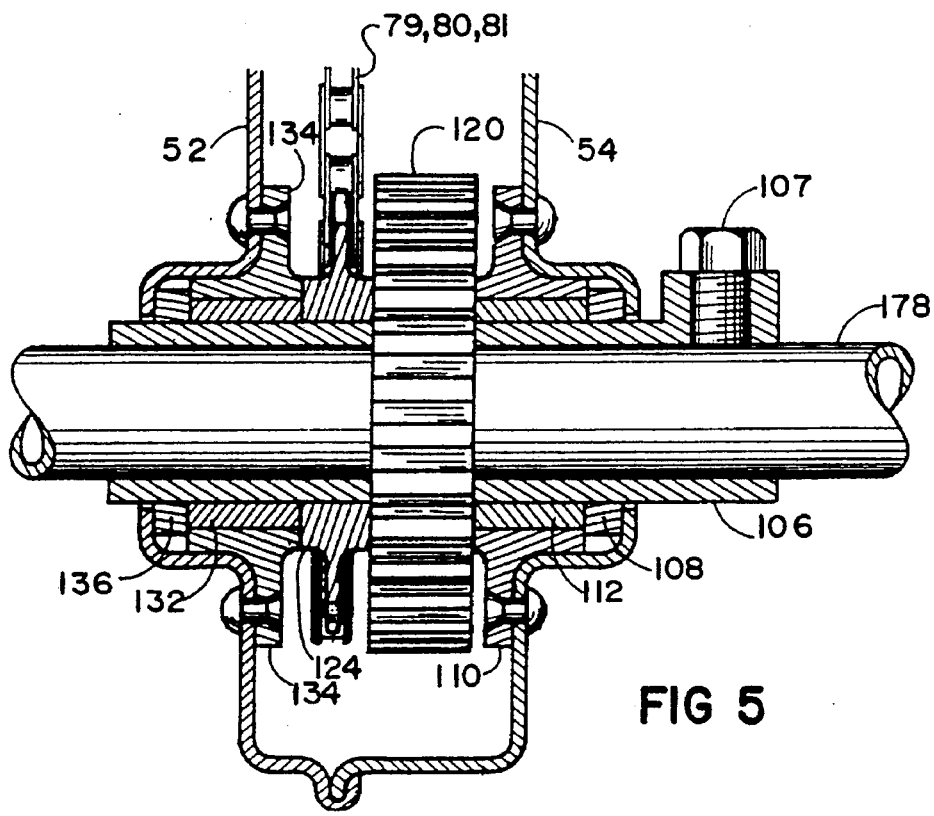
FIG. 5 shows details of the like rotating outlet in FIG. 2 and section 5—5 FIG. 8.
Figure 6:
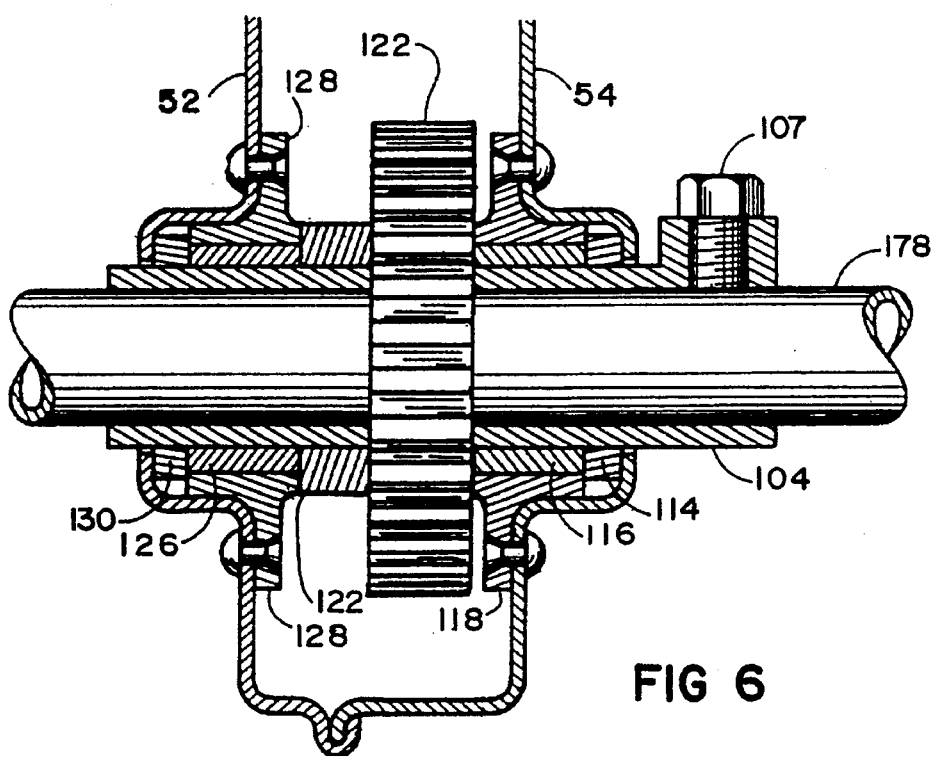
FIG. 6 shows details of the counterrotating outlet in FIG. 2 and section 6—6 FIG. 8.

The reversing mechanism shown in FIGS. 2 and 3 is compact and simple. Remote outlets from a transmission can be reached without the use of gears. Shift control at a console is possible through flexible cables commonly used to throttle engines.

CONCLUSION AND SCOPE

While my above description contains many specificities, these should not be construed as limitation on the scope of the invention, but rather an exemplification of embodiments and ramifications thereof. Many other variation are possible; i.e., the scoop could employ a double blade; hilling and furrowing plows could be added; the aerators could harrow; carts, augers, trenchers, sickle bards, dethatchers, sweepers, and broadcasters could yield additional ramifications; and a take off could power a blower that vacuums through a container carried by the fork lift rack. The power take off could, also, operate a pressure washer, log splitter, and generator. Accordingly, the scope of the invention should be determined by the appended claims and their legal equivalents rather than by the examples given.

I claim:

1. In at least one rotary outlet, a compact method for reversing rotation by a levered action on an inlet shaft comprising the steps of:

(a) mounting a pair of freely rotating elements on said shaft;

(b) providing a single, endless, flexible means to connect each of said pair of elements to said rotary outlets so that the elements of the pair counterrotate relative to each other;

(c) providing a means to randomly, separately, and temporarily join each one of the pair of elements to the inlet shaft in response to an external signal thereby alternately passing from clockwise to neutral to counterclockwise to neutral and return to clockwise rotation for the outlets.

2. The method in claim 1 further including in landscaping and gardening three way console shifting the direction of rotation of one or more outlet shafts connected to a single rotary inlet shaft by an endless flexible linkage in a transmission housing where axles of said inlet and said outlet shafts are parallel and substantially separated comprising the steps of:

(a) inserting said inlet shaft into a sleeve through a spline;

(b) press-fitting a collar on said sleeve at a first end to engage a console levered means that moves the sleeve longitudinally relative to the inlet shaft;

(c) providing a disk with clutch facings on each side at a second end of the sleeve;

(d) mounting on the shaft a first freely rotating element with a clutch face opposite to a first side of said disk;

(e) mounting on the sleeve a second freely rotating element with a clutch face opposite to a second side of the disk;

(f) meshing said endless flexible linkage to drive said outlets in predetermined directions and to simultaneously contact said first and said second rotating elements so that rotation in the first element is opposite to rotation in the second element; and (g) Activating said levered means so that one disk clutch facing contacts the opposing facing on one rotating element and the other element continues to rotate freely, thereby providing forward or backward rotation from neutral for the outlets, since the direction of input rotation is fixed and the two elements rotate in opposite directions.

3. The method in claim 2 for three-way shifting the direction of rotation of a plurality of rotating outlets from a transmission further including in the steps thereof:

(a) connecting an inlet of said transmission to a rotating power source by a longitudinally slidable means with a first end splined with said power source and a center region journaled in said transmission;

(b) shaping a second end of said slidable means to nonrotatably support a disk perpendicular to the axis of rotation of said slidable means whereon the periphery of said disk contains a pair of sets of jaws and recesses with one set on each side of said disk;

(c) journaling a first freely rotating element containing a first set of jaws and recesses that can be meshed with a first of said pair of sets on said disk;

(d) journaling a second freely rotating element containing a second set of jaws and recesses that can be meshed with a second of said pair of sets on said disk;

(e) connecting said first and said second rotating elements to said plurality of outlets by a single endless, flexible linkages;

(f) longitudinally adjusting said slidable means to locate said disk at a neutral position midway between said first and said second rotating elements;

(g) longitudinally sliding said slidable means from said neutral position to a first engagement position where said first of said pair of sets meshes with said first set of jaws and recesses on said first rotating element thereby rotating the outlets of said transmission in a given direction; and (h) longitudinally sliding said slidable means from said first engagement position through said neutral position to a second engagement position where said second of said pair of sets meshes with said second set of jaws and recesses on said second rotating element thereby rotating the outlets of said transmission opposite to said given direction.

4. The method of claim 3 further installing a dampening means between said first end of said slidable means and said power source to absorb the shock of shifting said sets of jaws and recesses at a differential angular velocity.

5. In the field of landscaping and gardening for walking attendants and their suppliers a method for improving performance and safety and reducing pollution and costs comprising the steps of:

(a) providing console controlled means to reverse rotary power to an inlet to a transmission and means to transfer said power from said inlet equally to three outlets two of which counterrotate where axes of the inlet and said outlets are parallel and, also, perpendicular to a direction of travel of said transmission;

(b) coupling the inlet of the transmission through a speed reducer to an engine to form a power train;

(c) mounting said power train on a frame with handlebars and controls thus completing a basic structure;

(d) inventorying components and subassemblies that contribute to the configuration and application of implements attachable to said basic structure; and (e) mounting a selection of said components and subassemblies at the outlets of the transmission and on said frame of the basic structure so as to yield a completed machine for accomplishing a unique task in landscaping and gardening.

6. The method in claim 5 at step e wherein mounting said selection of components and subassemblies at the outlets of the transmission and on the frame of the basic structure comprises:

(a) mounting a pair of axles on a pair of like rotating outlets from said transmission;

(b) mounting an array of tines on a front axle of said pair of axles; and (c) mounting a pair of wheels on a rear axle of the pair of axles, thereby completing a front tine tiller.

7. The method in claim 5 at step e wherein mounting said selection of components and subassemblies at the outlets of the transmission and on the frame of the basic structure comprises;

(a) mounting a pair of axles on a pair of counterrotating outlets from said transmission; and (b) mounting an array of tines on each of said axles thereby completing a counterrotating tiller.

8. The method in claim 5 at step e wherein mounting said selection of components and subassemblies at the outlets of the transmission and on the frame of the basic structure comprises;

(a) assembling the basic structure without handlebars thereby creating a second basic structure;

(b) mounting a pair of axles on two outlets from the transmission;

(c) entering four collared inserts in the ends of each of said pair of axles so that at least one of said inserts receives rotary power from the axle;

(d) on the ends of two inserts at one side of said second basic structure mounting a means to transmit on contact a signal to reverse rotation to a reversing means acting on an input to the transmission thereby completing the assembly of an agitator;

(e) placing said agitator so that said collared inserts roll on upward edges of two sides of a sluice box; and (f) mounting a pair of stops at each end of said sluice box so as to contact said means to receive and transmit a signal to reverse rotation when said agitator rolls to either end of the sluice box, thereby completing a mixer and separator.

9. The method in claim 5 at step e wherein mounting said selection of components and subassemblies at the outlets of the transmission and on the frame of the basic structure comprises:

(a) mounting a pair of axles on a pair of couterrotating outlets from the transmission;

(b) mounting an array of tines on each of said axles;

(c) mounting a pair of rear flanges with support bars and a pair of front flanges with support bars on the basic structure; and (d) rigidly mounting a front single blade on said front support bars and a rear single blade on said rear support bars thereby completing a counterrotating wet lands tiller.

10. The method in claim 5 at step e wherein mounting said selection of components and subassemblies at the outlets of the transmission and on the frame of the basic structure comprises:

(a) mounting a pair of axles on a pair of counterrotating outlets from the transmission;

(b) mounting an array of chisel tines on each of said axles;

(c) mounting a pair of front flanges with support bars on the basic structure; and (d) rigidly mounting a single blade on said support bars so as to carry ballast thereby completing a hard ground tiller.

11. The method in claim 5 at step e wherein mounting said selection of components and subassemblies at the outlets of the transmission and on the frame of the basic structure comprises:

(a) mounting a pair of axles on a pair of likerotating outlets from the transmission;

(b) mounting an array of chisel tines oriented for like rotation on said pair of axles; and (c) mounting a moldboard plow on the rear of the basic structure, thereby completing a combined moldboard and chisel plow.

12. The method in claim 5 at step e wherein mounting said selection of components and subassemblies at the outlets of the transmission and on the frame of the basic structure comprises:

(a) mounting a pair of axles on a pair of likerotating outlets from the transmission;

(b) mounting an array of chisel tines oriented for like rotation on said pair of axles;

(c) mounting on the basic structure a pair of front flanges with support bars; and (d) rigidly mounting a single blade on said support bars so as to grade thereby completing a grader.

13. The method in claim 5 at step e wherein mounting said selection of components and subassemblies at the outlets of the transmission and on the frame of the basic structure comprises;

(a) mounting a pair of axles on a pair of likerotating outlets from the transmission;

(b) mounting a pair of wheels on each of said pair of axles to receive rotative power from the axles;

(c) mounting a pair of front flanges with support bars on extensions to said frame; and (d) rigidly mounting a double blade to said support bars thereby completing a snow dozer.

14. The method in claim 5 at step e wherein mounting said selection of components and subassemblies at the outlets of the transmission and on the frame of the basic structure comprises;

(a) mounting a pair of axles on a pair of likerotating outlets from the transmission;

(b) mounting a pair of wheels on each of said pair of axles to receive rotative power from the axles; and (c) mounting a snow plow on the basic structure thereby completing a powered snow plow.

15. The method in claim 14, further including the step of mounting a pair of wheel tracks one at each side of the basic structure covering front and rear wheel to improve traction.

16. The method in claim 5 at step e wherein mounting said selection of components and subassemblies at the outlets of the transmission and on the frame of the basic structure comprises:

(a) mounting an axles in a rear outlet from the transmission;

(b) mounting a pair of wheels to rotate freely on said axle;

(c) mounting a pair of front flanges with support bars on extensions to said frame;

(d) rotatively mounting a cylinder with a roller chain on said support bars; and (e) mounting a sprocketed shaft insert on a forward outlet of the transmission to mesh with said roller chain thereby completing a powered roller.

17. The method in claim 5 at step e wherein mounting said selection of components and subassemblies at the outlets of the transmission and on the frame of the basic structure comprises:

(a) mounting a pair of axles on a pair of likerotating outlets from the transmission;

(b) mounting an array of tines on each of said pair of axles;

(c) mounting a pair of front flanges with supports on extensions to said frame; and (d) mounting a cylinder to rotate freely on said support bars thereby completing a combined lawn roller and aerator.

18. The method in claim 5 at step e wherein mounting said selection of components and subassemblies at the outlets of the transmission and on the frame of the basic structure comprises:

(a) mounting a pair of axles on a pair of counterrotating outlets from the transmission; and (b) mounting an array of aerating tines on a rear axle of said pair and a helical array of dethatchment tines on a front axle of the pair; thereby completing a combined aerator and dethatcher.

19. The method in claim 5 at step e wherein mounting said selection of components and subassemblies at the outlets of the transmission and on the frame of the basic structure comprises:

(a) mounting a pair of axles on a pair of likerotating outlets from the transmission;

(b) mounting a pair of wheels on each of said pair of axles to receive rotary power therefrom (c) mounting on the basic structure a pair of front flanges with support bars; and (d) rotatively mounting a single blade with a stop engaging said support bars thereby completing a scoop.

20. The method in claim 19 at step d wherein mounting said single blade with stop comprises the steps of:

(a) attaching end plates on each end of a blade back half with top stabilizer and scraper;

(b) attaching grooved end plate covers to each of said end plates so that linear slots in said grooved end plate covers protrude equally and perpendicularly from a plane containing the center of gravity of the single blade with the stop;

(c) inserting and turning a pair of bolts with rectangular heads and midway grooves into said linear slots so that said rectangular heads are free to move over the length of the slots in a space between the end plate covers and said end plates;

(d) inserting open side washers in said midway grooves on said bolts with rectangular heads; and (e) mounting the ends of said support bars onto the turned bolts with rectangular heads so as to draw with a nut said open side washers rigidly against the support bar ends thus enabling the single blade with stop to freely rotate and slide in the linear slot.

21. The method in claim 5 at step e wherein mounting said selection of components and subassemblies at the outlets of the transmission and on the frame of the basic structure comprises:

(a) mounting a pair of axles on a pair of likerotating outlets from the transmission;

(b) mounting a pair of wheels on each of said pair of axles to receive rotary power there from and provide a front pair of wheels; and (c) mounting a fork lift rack at the front of the basic structure thereby completing a powered fork lift.

22. The method in claim 20 further including the steps of:

(a) inserting a third axle in said fork lift rack and mounting a third pair of wheels to freely rotate on said third axle; and (b) joining said third pair of wheels to said front pair of wheels by a pair of wheel tracks thereby providing three pairs of powered wheels and increasing traction.

23. The method of claim 20 further including the steps of:

(a) mounting an unpowered shredder mechanism on said fork lift rack; and (b) belting said mechanism directly to said engine thereby completing a self propelled shredder.

24. The method in claim 5 at step e wherein mounting said selection of components and subassemblies at the outlets of the transmission and on the frame of the basic structure comprises:

(a) mounting a pair of wheels on an axle from a rear outlet of the transmission to rotate freely;

(b) mounting a corner brace at a right front corner of the frame;

(c) mounting a freely rotating wheel on a sized axle supported by a front outlet of the transmission and said corner brace;

(d) mounting a pair of corner braces at a left front corner of the frame;

(e) mounting an edger subassembly on said pair of corner braces; and (f) belting said edger subassembly directly to an output shaft of said engine thereby completing a powered edger.

25. The method in claim 5 at step e wherein mounting said selection of components and subassemblies at the outlets of the transmission and on the frame of the basic structure comprises:

(a) mounting a pair of wheels on a powered axle from a rear outlet of the transmission;

(b) mounting a pair of corner braces at the front of the frame;

(c) mounting a mower deck on said corner braces and the transmission by a means that prevents excessive rocking motion of said mower deck relative to the frame; and (d) belting the deck directly to an outlet of said engine thereby completing a self propelled, walk behind mower.

26. The method in claim 5 at step e wherein mounting said selection of components and subassemblies at the outlets of the transmission and on the frame of the basic structure comprises:

(a) mounting a penetrating tine, a chisel tine, a nonpenetrating tine, an axle, an axle insert, a frame extension, a support, a structural angle, a rear flange, a front flange, a corner brace, a wheel key, an agitator stop, an agitator reverser, a moldboard plow, a wheel, a track, a brace, a double blade, a single blade, a roller, a snow plow, a lift rack, a shredder, an edger subassembly, a dethatchment tine, and a mower deck; and (b) completing the assembly of a front tine tiller, a counterrotating tiller, a mixer and separator, a wet lands tiller, a hard ground tiller, a combined chisel and moldboard plow, a grader, a snow dozer, a snow plow, a powered roller, a combined aerator and roller, a combined aerator and dethatcher, a scoop, a fork lift, a self propelled shredder, an edger, and a self propelled walk behind mower.

* * * * *